(12) United States Patent
Guan

(10) Patent No.: US 12,418,336 B2
(45) Date of Patent: Sep. 16, 2025

(54) BEAM PAIR TRAINING METHOD AND COMMUNICATION APPARATUS

(71) Applicant: HUAWEI TECHNOLOGIES CO., LTD., Guangdong (CN)

(72) Inventor: Peng Guan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 457 days.

(21) Appl. No.: 17/890,412

(22) Filed: Aug. 18, 2022

(65) Prior Publication Data

US 2022/0394504 A1 Dec. 8, 2022

Related U.S. Application Data

(63) Continuation of application No. PCT/CN2020/075910, filed on Feb. 19, 2020.

(51) Int. Cl.
*H04W 16/28* (2009.01)
*H04B 17/336* (2015.01)
(Continued)

(52) U.S. Cl.
CPC .......... *H04W 16/28* (2013.01); *H04B 17/336* (2015.01); *H04L 5/0051* (2013.01); *H04W 24/10* (2013.01)

(58) Field of Classification Search
CPC ..... H04W 16/28; H04W 24/10; H04W 28/02; H04W 76/27; H04B 17/336; H04B 7/022; H04B 7/08; H04B 7/0617; H04L 5/0051
See application file for complete search history.

(56) References Cited

U.S. PATENT DOCUMENTS 10,461,826 B2 * 10/2019 Nagaraja ............... H04W 24/02
10,516,461 B2   12/2019 Mondal et al.
(Continued)

FOREIGN PATENT DOCUMENTS

CN   107888260 A   4/2018
CN   110224802 A   9/2019
(Continued)

OTHER PUBLICATIONS

Mediatek Inc: "Enhancements on multi-beam operations", 3GPP Draft; R1-1908380, Aug. 17, 2019, XP051764989, total 13 pages. (Year: 2019).*

(Continued)

*Primary Examiner* — Ayaz R Sheikh
*Assistant Examiner* — Louis Samara

(57) ABSTRACT

The technology of this application relates to a beam pair training method and a communication apparatus. The method includes receiving configuration information sent by a network device, where the configuration information is used to configure a downlink reference signal resource set and a first uplink reference signal resource set associated with the downlink reference signal resource set, measuring, based on the downlink reference signal resource set by using a first antenna panel of a terminal device, a downlink reference signal sent by the network device, and sending a first uplink reference signal to the network device based on the first uplink reference signal resource set by using a second antenna panel of the terminal device. Based on the solution provided in this application, a simultaneous-reception beam pair or a simultaneous-transmission beam pair including beams generated by different antenna panels of the terminal device can be obtained through training.

20 Claims, 13 Drawing Sheets

(51) Int. Cl.
H04L 5/00 (2006.01)
H04W 24/10 (2009.01)

(56) References Cited

U.S. PATENT DOCUMENTS

| | | | |
|---|---|---|---|
| 11,133,905 B2* | 9/2021 | Xu | H04W 28/02 |
| 2014/0376458 A1 | 12/2014 | Ryu et al. | |
| 2019/0074880 A1* | 3/2019 | Frenne | H04B 7/0617 |
| 2019/0132066 A1* | 5/2019 | Park | H04W 76/27 |
| 2019/0132851 A1 | 5/2019 | Davydov et al. | |
| 2019/0174438 A1* | 6/2019 | Zhang | H04W 72/0446 |
| 2021/0153215 A1 | 5/2021 | Guan et al. | |
| 2021/0266128 A1* | 8/2021 | Zhang | H04B 7/0617 |
| 2021/0329624 A1* | 10/2021 | Huang | H04L 5/0051 |
| 2022/0369321 A1* | 11/2022 | Guan | H04B 7/0617 |
| 2023/0132757 A1* | 5/2023 | Kang | H04B 7/08 370/329 |

FOREIGN PATENT DOCUMENTS

| | | | | |
|---|---|---|---|---|
| CN | 110741566 A * | 1/2020 | | H04B 7/0417 |
| WO | WO-2020015757 A1 * | 1/2020 | | H04B 7/022 |
| WO | 2020030050 A1 | 2/2020 | | |

OTHER PUBLICATIONS

Yu-Ngok Ruyue Li et al., Beam Management in Millimeter-Wave Communications for 5G and Beyond. IEEE Access (vol. 8), Jan. 1, 2020, 12 pages.
3GPP TS 38.211 V15.7.0 (Sep. 2019), 3rd Generation Partnership Project; Technical Specification Group Radio Access Network; NR; Physical channels and modulation (Release 15), 97 pages.
Vivo, Beam management procedure and beam reporting for NR. 3GPP TSG RAN WG1 Meeting #88, Athens, Greece, Feb. 13-17, 2017, R1-1703388, 5 pages.
3GPP TS 38.212 V15.7.0 (Sep. 2019), 3rd Generation Partnership Project; Technical Specification Group Radio Access Network; NR; Multiplexing and channel coding (Release 15), 101 pages.
3GPP TS 38.213 V15.7.0 (Sep. 2019), 3rd Generation Partnership Project; Technical Specification Group Radio Access Network; NR; Physical layer procedures for control (Release 15), 108 pages.
3GPP TS 38.214 V15.7.0 (Sep. 2019), 3rd Generation Partnership Project; Technical Specification Group Radio Access Network; NR; Physical layer procedures for data (Release 15), 106 pages.
3GPP TS 38.321 V15.7.0 (Sep. 2019), 3rd Generation Partnership Project; Technical Specification Group Radio Access Network; NR; Medium Access Control (MAC) protocol specification(Release 15), 78 pages.
3GPP TS 38.331 V15.7.0 (Sep. 2019), 3rd Generation Partnership Project; Technical Specification Group Radio Access Network; NR; Radio Resource Control (RRC) protocol specification (Release 15), 527 pages.
3GPP TS 38.133 V15.7.0 (Sep. 2019), 3rd Generation Partnership Project; Technical Specification Group Radio Access Network; NR; Requirements for support of radio resource management (Release 15), 1042 pages.
3GPP TS 38.306 V15.7.0 (Sep. 2019), 3rd Generation Partnership Project; Technical Specification Group Radio Access Network; NR; User Equipment (UE) radio access capabilities (Release 15), 55 pages.
International Search Report and Written Opinion issued in PCT/CN2020/075910, dated Nov. 10, 2020, 10 pages.
Mediatek Inc: "Enhancements on multi-beam operations", 3GPP Draft; R1-1908380, Aug. 17, 2019, XP051764989, total 13 pages.
Extended European Search Report issued in EP20919459.6, dated Nov. 8, 2022, 12 pages.
European Patent Office Communication for EP Application No. 20919459.6 dated Apr. 5, 2024, 4 pages.

* cited by examiner

```
TCI-State ::=           SEQUENCE {
  tci-StateId             TCI-StateId,
  qcl-Type1               QCL-Info,
  qcl-Type2
  ...
}

QCL-Info ::=            SEQUENCE {
  cell                    ServCellIndex
  bwp-Id                  BWP-Id
  referenceSignal         CHOICE {
    csi-rs                  NZP-CSI-RS-ResourceId,
    ssb                     SSB-Index,
  },
    qcl-Type    ENUMERATED {type A, type B, type C, type D}
}
```

FIG. 12

```
TCI-State ::=           SEQUENCE {
  tci-StateId             TCI-StateId,
  qcl-Type1               QCL-Info,
  ...
}

QCL-Info ::=            SEQUENCE {
  cell                    ServCellIndex
  bwp-Id                  BWP-Id
  referenceSignal         {
    SRS                     SRS-ResourceId,
    CSI-RS                  NZP-CSI-RS-ResourceId,
  },
  qcl-Type                QCL TypeE,
  ...
}
```

FIG. 13

```
TCI-State ::=           SEQUENCE {
    tci-StateId         TCI-StateId,
    qcl-Type1           QCL-Info,
    ...
}

QCL-Info ::=            SEQUENCE {
    cell                ServCellIndex
    bwp-Id              BWP-Id
    referenceSignal     {
        SRS             SRS-ResourceId,
        CSI-RS              NZP-CSI-RS-ResourceId,
    },
    qcl-Type            QCL TypeF,
    ...
}
```

BEAM PAIR TRAINING METHOD AND COMMUNICATION APPARATUS

CROSS-REFERENCE TO RELATED APPLICATIONS

This application is a continuation of International Application No. PCT/CN2020/075910, filed on Feb. 19, 2020, the disclosure of which is hereby incorporated by reference in its entirety.

TECHNICAL FIELD

The present technology relates to the field of terminal technologies, and in particular, to a beam pair training method and a communication apparatus.

BACKGROUND

In a high-frequency communication system, to combat a path loss, a network and a terminal usually communicate with each other by forming an analog beam by using a directional high-gain antenna array. Generally, the analog beam is directional, and a main lobe direction and a 3 dB beam width may be used to describe an analog beam pattern. A narrower beam width indicates a larger antenna gain. A network device and a terminal device may transmit data in a specific direction by using an analog beam. To improve a transmission capacity or transmission robustness, the terminal device may transmit data by using a simultaneous-transmission beam pair or a simultaneous-reception beam pair. The simultaneous-transmission beam pair of the terminal device is two transmission beams, of the terminal device, for performing sending at the same time. The simultaneous-reception beam pair of the terminal device is two reception beams, of the terminal device, for performing receiving at the same time. To further improve the data transmission robustness, the terminal device needs to transmit data by using a simultaneous-reception beam pair/simultaneous-transmission beam pair including beams generated by different antenna panels. However, currently, a simultaneous-reception beam pair/simultaneous-transmission beam pair including beams generated by different antenna panels cannot be obtained for the terminal device through training.

SUMMARY

This application provides a beam pair training method and a communication apparatus, to help obtain, for a terminal device through training, a simultaneous-reception beam pair or a simultaneous-transmission beam pair including beams generated by different antenna panels.

According to a first aspect, this application provides a beam pair training method. The method includes: receiving configuration information sent by a network device, where the configuration information is used to configure a downlink reference signal resource set and a first uplink reference signal resource set associated with the downlink reference signal resource set; measuring, based on the downlink reference signal resource set by using a first antenna panel of a terminal device, a downlink reference signal sent by the network device; and sending a first uplink reference signal to the network device based on the first uplink reference signal resource set by using a second antenna panel of the terminal device, where the first antenna panel is different from the second antenna panel.

Based on the method described in the first aspect, uplink beam training and downlink beam training can be performed by using different antenna panels of the terminal device, to obtain an optimal reception beam and an optimal transmission beam of the different antenna panels of the terminal device through training. In this way, a simultaneous-reception beam pair or a simultaneous-transmission beam pair including beams generated by the different antenna panels of the terminal device can be obtained based on the optimal reception beam and the optimal transmission beam of the different antenna panels of the terminal device. It can be learned that, based on the method described in the first aspect, a simultaneous-reception beam pair or a simultaneous-transmission beam pair including beams generated by different antenna panels of the terminal device can be obtained through training.

In a possible implementation, further, first indication information may be fed back to the network device based on a measurement result of the downlink reference signal, where the first indication information includes information used to indicate a first downlink reference signal resource in the downlink reference signal resource set. Further, after the first uplink reference signal is sent to the network device based on the first uplink reference signal resource set by using the second antenna panel of the terminal device, second indication information sent by the network device may be received, where the second indication information is used to indicate a simultaneous-reception beam pair and/or a simultaneous-transmission beam pair of the terminal device, the simultaneous-reception beam pair includes a first reception beam and a second reception beam, the simultaneous-transmission beam pair includes a first transmission beam and a second transmission beam, the first reception beam is a reception beam of the first downlink reference signal resource, the second transmission beam is a transmission beam determined by the network device based on a measurement result of the first uplink reference signal, the second reception beam is a reception beam corresponding to the second transmission beam, and the first transmission beam is a transmission beam corresponding to the first reception beam. Based on the possible implementation, a simultaneous-reception beam pair or a simultaneous-transmission beam pair including beams generated by different antenna panels of the terminal device can be obtained through training.

In a possible implementation, specifically, the simultaneous-reception beam pair and/or the simultaneous-transmission beam pair of the terminal device may be indicated by using a transmission configuration index state (TCI state) identifier. Based on the implementation, the simultaneous-reception beam pair and/or the simultaneous-transmission beam pair of the terminal device can be more accurately indicated.

In a possible implementation, a reference signal (referenceSignal) used to indicate a TCI state corresponding to a TCI state identifier of the simultaneous-reception beam pair of the terminal device includes two reference signal resource identifiers. One is an uplink reference signal resource identifier SRS-ResourceId, for example, used to indicate an SRS resource #1. The other is a downlink reference signal resource identifier NZP-CSI-RS-ResourceId, for example, used to indicate a CSI-RS resource #1. The TCI state further includes a QCL type E, used to indicate the simultaneous-reception beam pair. Based on the implementation, content included in the TCI state is redefined, so that the TCI state identifier can indicate the simultaneous-reception beam pair.

In a possible implementation, a reference signal (referenceSignal) used to indicate a TCI state corresponding to a TCI state identifier of the simultaneous-transmission beam pair of the terminal device includes two reference signal resource identifiers. One is an uplink reference signal resource identifier SRS-ResourceId, for example, used to indicate an SRS resource #1. The other is a downlink reference signal resource identifier NZP-CSI-RS-ResourceId, for example, used to indicate a CSI-RS resource #1. The TCI state further includes a QCL type F, used to indicate the simultaneous-transmission beam pair. Based on the implementation, content included in the TCI state is redefined, so that the TCI state identifier can indicate the simultaneous-transmission beam pair.

In a possible implementation, the TCI state identifier used to indicate the simultaneous-transmission beam pair and the TCI state identifier used to indicate the simultaneous-reception beam pair may alternatively be a same TCI state identifier. In this case, the QCL type in the TCI state is used to indicate that a transmission beam and a reception beam have consistency about a spatial parameter.

In a possible implementation, alternatively, the first indication information may not be sent and the second indication information may not be received. The terminal device may receive third indication information sent by the network device, where the third indication information is used to indicate an optimal transmission beam that is of the second antenna panel of the terminal device and that is obtained through uplink beam training or indicate a reception beam corresponding to the optimal transmission beam. After receiving the third indication information, the terminal device determines a simultaneous-transmission beam pair and/or a simultaneous-reception beam pair based on the third indication information and a first downlink reference signal resource (that is, a downlink reference signal resource corresponding to an optimal reception beam of the first antenna panel). Based on the possible implementation, the network device needs to indicate only one beam to the terminal device, and the terminal device can accurately determine the simultaneous-transmission beam pair and/or the simultaneous-reception beam pair.

In a possible implementation, a transmission beam used to send the first uplink reference signal is determined based on the reception beam of the first downlink reference signal resource. In other words, the reception beam of the first downlink reference signal resource is a beam reference of the transmission beam used by the terminal device to send the first uplink reference signal, and a transmission beam used for uplink beam training is determined based on an optimal reception beam obtained through training. The transmission beam used to send the first uplink reference signal may be a transmission beam having highest correlation with the reception beam of the first downlink reference signal resource. In this way, the simultaneous-transmission beam pair and/or the simultaneous-reception beam pair obtained through training may be used to transmit same data, helping increase a transmission capacity. Alternatively, the transmission beam used to send the first uplink reference signal may be a transmission beam having lowest correlation with the reception beam of the first downlink reference signal resource. In this way, when the simultaneous-transmission beam pair and/or the simultaneous-reception beam pair obtained through training are/is used to transmit different data, data transmission reliability is improved.

In a possible implementation, the downlink reference signal resource set includes a channel measurement resource set and an interference measurement resource set corresponding to the channel measurement resource set, the first downlink reference signal resource is a first channel measurement resource, the first channel measurement resource corresponds to a first interference measurement resource, and a transmission beam used to send the first uplink reference signal is determined based on a transmission beam used by the network device to send the first interference measurement resource. This implementation helps reduce interference between the simultaneous-reception beam pair and/or the simultaneous-transmission beam pair obtained through training.

In a possible implementation, the terminal device activates one of the first antenna panel and the second antenna panel at a same time point. In other words, the first antenna panel and the second antenna panel are not simultaneously activated. This helps reduce complexity and power consumption of the terminal device.

In a possible implementation, a time offset between a last downlink reference signal resource in the downlink reference signal resource set and a $1^{st}$ uplink reference signal resource in the first uplink reference signal resource set is a preset value, or a time offset between a $1^{st}$ downlink reference signal resource in the downlink reference signal resource set and a last uplink reference signal resource in the first uplink reference signal resource set is a preset value, and the preset value is greater than or equal to an activation time period of an antenna panel of the terminal device. This possible implementation can ensure that the first antenna panel and the second antenna panel are not simultaneously activated. This helps reduce complexity and power consumption of the terminal device.

In a possible implementation, the configuration information is further used to indicate an antenna panel used to measure the downlink reference signal and/or an antenna panel used to send the first uplink reference signal. Optionally, the configuration information may indicate the antenna panel used to measure the downlink reference signal, and the antenna panel used to send the first uplink reference signal may be pre-specified in a protocol. Alternatively, the configuration information may indicate the antenna panel used to send the first uplink reference signal, and the antenna panel used to measure the downlink reference signal may be pre-specified in a protocol. Alternatively, the configuration information is used to indicate the antenna panel used to measure the downlink reference signal and the antenna panel used to send the first uplink reference signal. Based on the possible implementation, the terminal device can perform uplink beam training and downlink beam training by using different antenna panels.

In a possible implementation, the configuration information is further used to indicate to use different antenna panels to measure the downlink reference signal and send the first uplink reference signal. Based on the possible implementation, the terminal device can perform uplink beam training and downlink beam training by using different antenna panels.

In a possible implementation, the configuration information is further used to configure a second uplink reference signal resource set associated with the downlink reference signal resource set. Further, a second uplink reference signal is sent to the network device based on the second uplink reference signal resource set by using the first antenna panel, where a transmission beam used to send the second uplink reference signal is determined based on a reception beam of a first downlink reference signal resource, and the first downlink reference signal resource is determined from the downlink reference signal resource set based on a measurement result of the downlink reference signal. An optimal reception beam found through downlink beam training is not necessarily suitable to be used as one of transmission beams in an uplink simultaneous-transmission beam pair of the terminal device. Therefore, in this possible implementation, uplink beam training is also performed on an optimal beam for sending. This helps obtain, through training, an optimal terminal-side simultaneous-transmission beam pair and/or simultaneous-reception beam pair.

In a possible implementation, second indication information sent by the network device is received, where the second indication information is used to indicate a simultaneous-reception beam pair and/or a simultaneous-transmission beam pair of the terminal device, the simultaneous-transmission beam pair includes a first transmission beam and a second transmission beam, the simultaneous-reception beam pair includes a first reception beam corresponding to the first transmission beam and a second reception beam corresponding to the second transmission beam, the first transmission beam is a transmission beam determined by the network device based on a measurement result of the first uplink reference signal, and the second transmission beam is a transmission beam determined by the network device based on a measurement result of the second uplink reference signal. Based on this possible implementation, the terminal device can obtain the simultaneous-reception beam pair and/or the simultaneous-transmission beam pair of the terminal device.

In a possible implementation, a time point at which the first uplink reference signal is sent is the same as a time point at which the second uplink reference signal is sent. Based on this possible implementation, the network device can more accurately determine the simultaneous-transmission beam pair and/or the simultaneous-reception beam pair of the terminal device.

In a possible implementation, the configuration information is further used to indicate an antenna panel used to measure the downlink reference signal and an antenna panel used to send the second uplink reference signal and/or indicate an antenna panel used to send the first uplink reference signal. Optionally, the configuration information may indicate the antenna panel used to measure the downlink reference signal and the antenna panel used to send the second uplink reference signal, and the antenna panel used to send the first uplink reference signal may be pre-specified in a protocol. Alternatively, the configuration information may indicate the antenna panel used to send the first uplink reference signal, and the antenna panel used to measure the downlink reference signal and the antenna panel used to send the second uplink reference signal may be pre-specified in a protocol. Alternatively, the configuration information is used to indicate the antenna panel used to measure the downlink reference signal, the antenna panel used to send the second uplink reference signal, and the antenna panel used to send the first uplink reference signal. Based on the possible implementation, the terminal device can perform uplink beam training and downlink beam training by using different antenna panels.

In a possible implementation, the configuration information is further used to indicate to use a same antenna panel to measure the downlink reference signal and send the second uplink reference signal, and indicate the terminal device to send the first uplink reference signal and the second uplink reference signal by using different antenna panels. Based on the possible implementation, the terminal device can perform uplink beam training and downlink beam training by using different antenna panels.

In a possible implementation, capability information of the terminal device may be reported, where the capability information indicates whether the terminal device supports the method in the first aspect or the possible implementations of the first aspect.

In a possible implementation, as predefined in a protocol or as indicated by the network device, the terminal device may perform the method in the first aspect or the possible implementations of the first aspect.

The method described in the first aspect and the possible implementations of the first aspect may be performed by the terminal device or a chip in the terminal device.

According to a second aspect, this application provides a beam pair training method. The method includes: sending configuration information to a terminal device, where the configuration information is used to configure a downlink reference signal resource set and a first uplink reference signal resource set associated with the downlink reference signal resource set; sending a downlink reference signal to the terminal device based on the downlink reference signal resource set; receiving first indication information fed back by the terminal device, where the first indication information includes information used to indicate a first downlink reference signal resource in the downlink reference signal resource set; measuring, based on the first uplink reference signal resource set, a first uplink reference signal sent by the terminal device; and sending second indication information to the terminal device, where the second indication information is used to indicate a simultaneous-reception beam pair and/or a simultaneous-transmission beam pair of the terminal device, the simultaneous-reception beam pair includes a first reception beam and a second reception beam, the simultaneous-transmission beam pair includes a first transmission beam and a second transmission beam, the first reception beam is a reception beam of the first downlink reference signal resource, the second transmission beam is a transmission beam determined based on a measurement result of the first uplink reference signal, the second reception beam is a reception beam corresponding to the second transmission beam, and the first transmission beam is a transmission beam corresponding to the first reception beam.

In a possible implementation, a time offset between a last downlink reference signal resource in the downlink reference signal resource set and a $1^{st}$ uplink reference signal resource in the first uplink reference signal resource set is a preset value, or a time offset between a $1^{st}$ downlink reference signal resource in the downlink reference signal resource set and a last uplink reference signal resource in the first uplink reference signal resource set is a preset value, and the preset value is greater than or equal to an activation time period of an antenna panel of the terminal device.

In a possible implementation, the configuration information is further used to indicate an antenna panel used to measure the downlink reference signal and/or an antenna panel used to send the first uplink reference signal. For specific indication of the configuration information, refer to corresponding descriptions in the first aspect.

In a possible implementation, the configuration information is further used to indicate to use different antenna panels to measure the downlink reference signal and send the first uplink reference signal.

In a possible implementation, specifically, the simultaneous-reception beam pair and/or the simultaneous-transmission beam pair of the terminal device may be indicated by using a TCI state identifier. Based on the implementation, the simultaneous-reception beam pair and/or the simultaneous-transmission beam pair of the terminal device can be more accurately indicated. For content included in a TCI state corresponding to the TCI state identifier of the simultaneous-reception beam pair of the terminal device, refer to corresponding descriptions in the first aspect.

In a possible implementation, alternatively, the first indication information may not be received and the second indication information may not be sent. Third indication information may be sent to the terminal device, where the third indication information is used to indicate an optimal transmission beam that is of the second antenna panel of the terminal device and that is obtained through uplink beam training or indicate a reception beam corresponding to the optimal transmission beam. In this way, after receiving the third indication information, the terminal device determines the simultaneous-transmission beam pair and/or the simultaneous-reception beam pair based on the third indication information and the first downlink reference signal resource (that is, a downlink reference signal resource corresponding to an optimal reception beam of a first antenna panel). Based on this possible implementation, the terminal device can accurately determine the simultaneous-transmission beam pair and/or the simultaneous-reception beam pair.

In a possible implementation, reported capability information of the terminal device may be received, where the capability information indicates whether the terminal device supports the method in the first aspect or the possible implementations of the first aspect.

In a possible implementation, as predefined in a protocol or as indicated by a network device, the terminal device may perform the method in the first aspect or the possible implementations of the first aspect.

The method described in the second aspect and the possible implementations of the second aspect may be performed by the network device or a chip in the network device.

According to a third aspect, this application provides a beam pair training method. The method includes: sending configuration information to a terminal device, where the configuration information is used to configure a downlink reference signal resource set and a first uplink reference signal resource set and a second uplink reference signal resource set that are associated with the downlink reference signal resource set; sending a downlink reference signal to the terminal device based on the downlink reference signal resource set; measuring, based on the first uplink reference signal resource set, a first uplink reference signal sent by the terminal device; and measuring, based on the second uplink reference signal resource set, a second uplink reference signal sent by the terminal device; and sending second indication information to the terminal device, where the second indication information is used to indicate a simultaneous-reception beam pair and/or a simultaneous-transmission beam pair of the terminal device, the simultaneous-transmission beam pair includes a first transmission beam and a second transmission beam, the simultaneous-reception beam pair includes a first reception beam corresponding to the first transmission beam and a second reception beam corresponding to the second transmission beam, the first transmission beam is a transmission beam determined based on a measurement result of the first uplink reference signal, and the second transmission beam is a transmission beam determined based on a measurement result of the second uplink reference signal.

In a possible implementation, the configuration information is further used to indicate an antenna panel used to measure the downlink reference signal and an antenna panel used to send the second uplink reference signal and/or indicate an antenna panel used to send the first uplink reference signal. For specific indication of the configuration information, refer to corresponding descriptions in the first aspect.

In a possible implementation, the configuration information is further used to indicate to use a same antenna panel to measure the downlink reference signal and send the second uplink reference signal, and indicate the terminal device to send the first uplink reference signal and the second uplink reference signal by using different antenna panels.

In a possible implementation, specifically, the simultaneous-reception beam pair and/or the simultaneous-transmission beam pair of the terminal device may be indicated by using a TCI state identifier. Based on the implementation, the simultaneous-reception beam pair and/or the simultaneous-transmission beam pair of the terminal device can be more accurately indicated. For content included in a TCI state corresponding to the TCI state identifier of the simultaneous-reception beam pair of the terminal device, refer to corresponding descriptions in the first aspect.

In a possible implementation, reported capability information of the terminal device may be received, where the capability information indicates whether the terminal device supports the method in the first aspect or the possible implementations of the first aspect.

In a possible implementation, as predefined in a protocol or as indicated by a network device, the terminal device may perform the method in the first aspect or the possible implementations of the first aspect.

The method described in the third aspect and the possible implementations of the third aspect may be performed by the network device or a chip in the network device.

For beneficial effects of the second aspect and the third aspect, refer to beneficial effects of the first aspect.

According to a fourth aspect, this application provides a communication apparatus. The apparatus may be a terminal device, an apparatus in the terminal device, or an apparatus that can be used together with the terminal device. The communication apparatus may alternatively be a chip system. The communication apparatus may perform the method according to the first aspect. A function of the communication apparatus may be implemented by hardware, or may be implemented by hardware by executing corresponding software. The hardware or the software includes one or more units corresponding to the foregoing function. The unit may be software and/or hardware. For operations performed by the communication apparatus and beneficial effects thereof, refer to the method in the first aspect and the beneficial effects thereof.

According to a fifth aspect, this application provides a communication apparatus. The apparatus may be a network device, an apparatus in the network device, or an apparatus that can be used together with the network device. The communication apparatus may alternatively be a chip system. The communication apparatus may perform the method according to the second aspect or the third aspect. A function of the communication apparatus may be implemented by hardware, or may be implemented by hardware by executing corresponding software. The hardware or the software includes one or more units corresponding to the foregoing function. The unit may be software and/or hardware. For operations performed by the communication apparatus and beneficial effects thereof, refer to the method in the second aspect or the third aspect and the beneficial effects thereof.

According to a sixth aspect, this application provides a communication apparatus. The communication apparatus includes a processor. When the processor invokes a computer program in a memory, the method according to any one of the first aspect to the third aspect is performed.

According to a seventh aspect, this application provides a communication apparatus. The communication apparatus includes a processor and a memory. The memory is configured to store computer-executable instructions. The processor is configured to execute the computer-executable instructions stored in the memory, to enable the communication apparatus to perform the method according to any one of the first aspect to the third aspect.

According to an eighth aspect, this application provides a communication apparatus. The communication apparatus includes a processor, a memory, and a transceiver. The transceiver is configured to receive a signal or send a signal. The memory is configured to store program code. The processor is configured to invoke the program code from the memory to perform the method according to any one of the first aspect to the third aspect.

According to a ninth aspect, this application provides a communication apparatus. The communication apparatus includes a processor and an interface circuit. The interface circuit is configured to receive code instructions and send the code instructions to the processor. The processor runs the code instructions to perform the method according to any one of the first aspect to the third aspect.

According to a tenth aspect, this application provides a computer-readable storage medium, where the computer-readable storage medium is configured to store instructions. When the instructions are executed, the method according to any one of the first aspect to the third aspect is implemented.

According to an eleventh aspect, this application provides a computer program product including instructions. When the instructions are executed, the method according to any one of the first aspect to the third aspect is implemented.

BRIEF DESCRIPTION OF DRAWINGS

FIG. 12 is an example schematic diagram of a TCI state in a current standard;

FIG. 13 is an example schematic diagram of a TCI state according to an embodiment of this application;

DESCRIPTION OF EMBODIMENTS

To make objectives, technical solutions, and advantages of this application clearer, the following further describes this application in detail with reference to accompanying drawings.

In the specification, claims, and accompanying drawings of this application, the terms "first", "second", and so on are intended to distinguish between different objects but do not indicate a particular order. In addition, the terms "including", "having", and any other variant thereof are intended to cover non-exclusive inclusion. For example, a process, a method, a system, a product, or a device that includes a series of operations or units is not limited to the listed operations or units, but optionally further includes an unlisted operation or unit, or optionally further includes another inherent operation or unit of the process, the method, the product, or the device.

An "embodiment" mentioned in this specification means that a particular characteristic, structure, or feature described with reference to the embodiments may be included in at least one embodiment of this application. The phrase that occurs at different positions in the specification does not necessarily refer to a same embodiment, or an independent or alternative embodiment exclusive of another embodiment. Person skilled in the art understand, in explicit and implicit manners, that an embodiment described in this specification may be combined with another embodiment.

In this application, "at least one (item)" means one or more, "a plurality of" means two or more, "at least two (items)" means two, three, or more, and "and/or" is used to describe a correspondence relationship between corresponding objects, and indicates that there may be at least three relationships. For example, "A and/or B" may indicate that only A exists, only B exists, and both A and B exist, where A and B may be singular or plural. The character "/" generally represents an "or" relationship between the associated objects. "At least one of the following items (pieces)" or a similar expression thereof indicates any combination of these items, including a single item or any combination of a plurality of items. For example, at least one of a, b, or c may indicate a, b, c, "a and b", "a and c", "b and c", or "a, b, and c", where a, b, and c may be singular or plural.

To better understand embodiments of this application, the following describes a system architecture used in embodiments of this application.

The method provided in embodiments of this application may be applied to various communication systems, for example, an Internet of Things (IoT) system, a narrow band Internet of Things (NB-IoT) system, a long term evolution (LTE) system, a 5th-generation (5G) communication system, an LTE-5G hybrid architecture, a 5G new radio (NR) system, and a new communication system emerging in future communication development.

Figure 1:
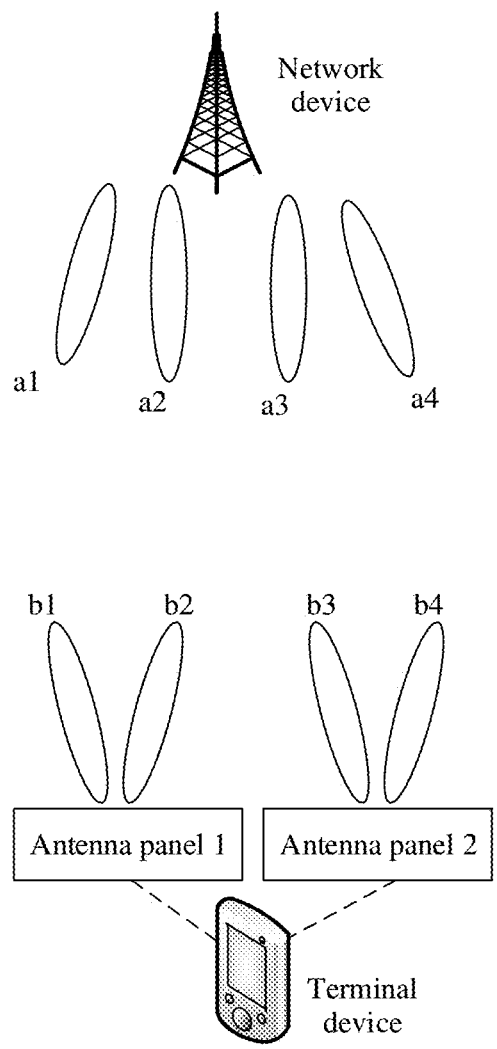
FIG. 1 is an example schematic diagram of a communication system according to an embodiment of this application.

FIG. 1 is a schematic diagram of an architecture of a communication system according to an embodiment of this application. The solutions in this application are applicable to the communication system. The communication system may include at least one network device and at least one terminal device. For example, in FIG. 1, the communication system includes one network device and one terminal device. The network device includes one or more antenna panels, and the terminal device includes a plurality of antenna panels. Each antenna panel may generate one or more beams for sending or receiving signals. The network device and the terminal device communicate with each other by using a beam. For example, as shown in FIG. 1, the network device may send a transmission beam a1 to a transmission beam a4 by using an antenna panel, and the terminal device may send a reception beam b1 to a reception beam b4 by using an antenna panel. The network device may perform downlink communication with a reception beam of the terminal device by using a transmission beam. Certainly, the terminal device may alternatively include one or more transmission beams, and the network device may alternatively include one or more reception beams. The terminal device may perform uplink communication with a reception beam of the network device by using a transmission beam.

The antenna panel in embodiments of this application may also be referred to as an antenna group. An antenna group is a set that includes a plurality of antennas. One antenna panel may correspond to one antenna group. Alternatively, in another embodiment, one antenna panel may correspond to a plurality of antenna groups, that is, a plurality of antenna groups are located on a same antenna panel.

The network device in embodiments of this application is an entity on a network side that is configured to emit or receive a signal, may be configured to mutually convert a received over-the-air frame and an internet protocol (IP) packet, and serves as a router between a terminal device and a remaining part of an access network. The remaining part of the access network may include an IP network and the like. The network device may further coordinate attribute management of an air interface. For example, the network device may be an evolved NodeB (eNB or e-NodeB) in LTE, a new radio controller (NR controller), a gNodeB (gNB) in a 5G system, a centralized unit (CU), a new radio base station, a radio remote module, a micro base station, a relay, a distributed unit (DU), a transmission reception point (TRP), a transmission point (TP), or any other radio access device. However, embodiments of this application are not limited thereto.

A terminal device in embodiments of this application is an entity on a user side that is configured to receive or emit a signal. The terminal device may be a device that provides a user with voice and/or data connectivity, for example, a handheld device or a vehicle-mounted device having a wireless connection function. The terminal device may alternatively be another processing device connected to a wireless modem. The terminal device may communicate with a radio access network (RAN). The terminal device may also be referred to as a wireless terminal, a subscriber unit, a subscriber station, a mobile station, a remote station, an access point, a remote terminal, an access terminal, a user terminal, a user agent, a user device, user equipment (UE), or the like. The terminal device may be a mobile terminal, for example, a mobile phone (or referred to as a "cellular" phone), and a computer that has a mobile terminal. For example, the terminal device may be a portable, pocket-sized, handheld, computer built-in, or a vehicle-mounted mobile apparatus, which exchanges a voice and/or data with the radio access network. For example, the terminal device may alternatively be a device such as a personal communication service (PCS) phone, a cordless telephone set, a session initiation protocol (SIP) phone, a wireless local loop (WLL) station, or a personal digital assistant (PDA). For example, common terminal devices include a mobile phone, a tablet computer, a notebook computer, a palmtop computer, a mobile internet device (MID), and a wearable device such as a smartwatch, a smart band, or a pedometer. However, embodiments of this application are not limited thereto.

To improve data transmission robustness (e.g., reliability), the terminal device needs to obtain, through training, a simultaneous-reception beam pair/simultaneous-transmission beam pair including beams generated by different antenna panels, and transmit data by using the simultaneous-reception beam pair/simultaneous-transmission beam pair obtained through training. The simultaneous-reception beam pair is a beam pair used to simultaneously receive data. The simultaneous-transmission beam pair is a beam pair used to simultaneously send data. The simultaneous-reception beam pair may include two or more reception beams. The simultaneous-transmission beam pair may include two or more transmission beams. For example, an optimal simultaneous-reception beam pair obtained by the terminal device through training is a simultaneous-reception beam pair including the beam b1 of an antenna panel 1 and the beam b4 of an antenna panel 2. The terminal device simultaneously receives same data by using the beam b1 of the antenna panel 1 and the beam b4 of the antenna panel 2, so that data transmission robustness can be improved. However, how to obtain, for the terminal device through training, a simultaneous-reception beam pair/simultaneous-transmission beam including beams generated by different antenna panels is a problem to be resolved.

Embodiments of this application provide a beam pair training method and a communication apparatus, to help obtain, for a terminal device through training, a simultaneous-reception beam pair or a simultaneous-transmission beam pair including beams generated by different antenna panels. The following describes in detail the beam pair training method provided in embodiments of this application.

Figure 2:
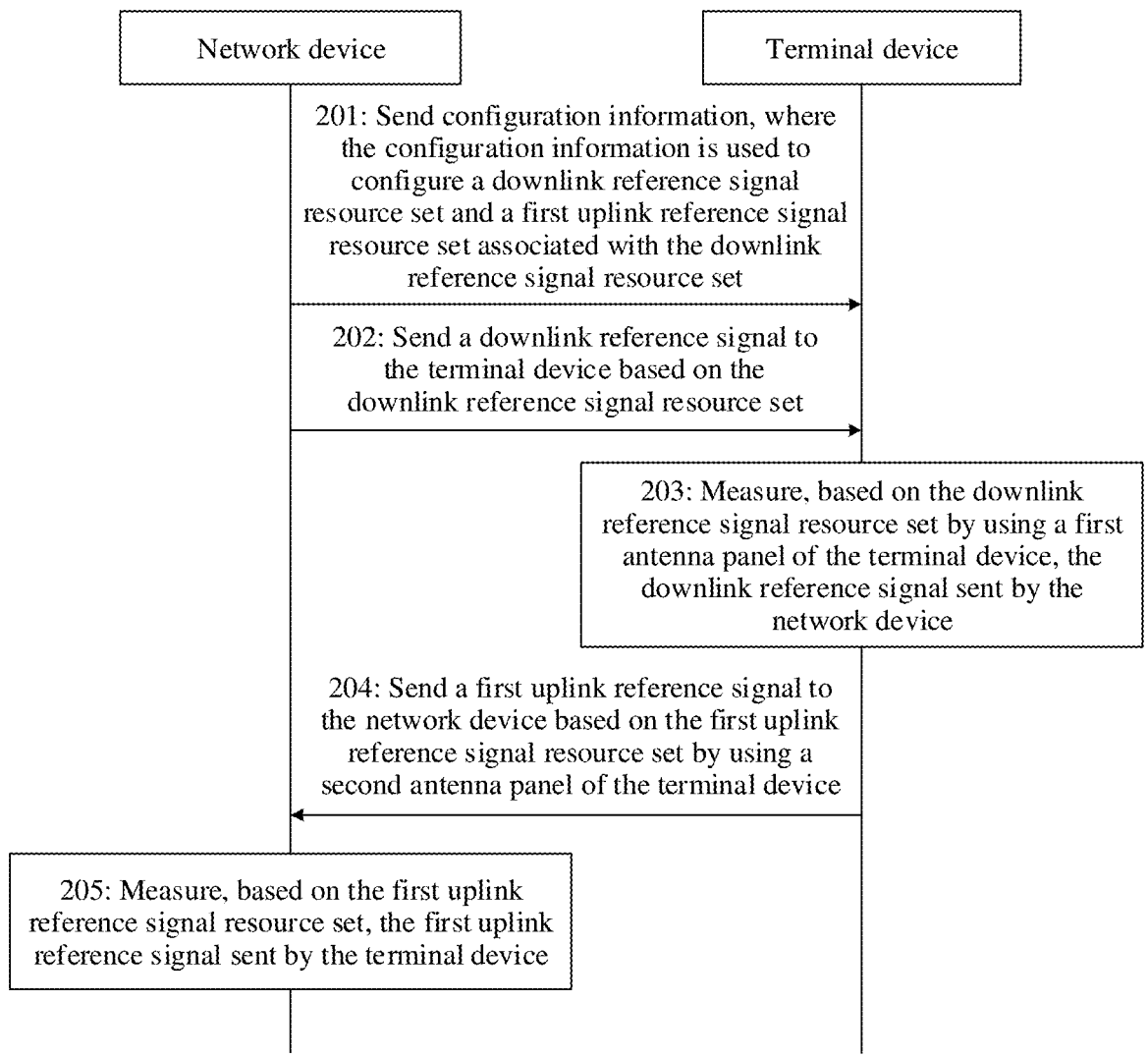
FIG. 2 is an example schematic flowchart of a beam pair training method according to an embodiment of this application.

FIG. 2 is a schematic flowchart of a beam pair training method according to an embodiment of this application. As shown in FIG. 2, the beam pair training method includes the following operations 201 to 205. The method shown in FIG. 2 may be performed by a network device and a terminal device, or may be performed by a chip in the network device and a chip in the terminal device. In FIG. 2, an example in which the method is performed by the network device and the terminal device is used for description. Execution bodies of beam pair training methods shown in other accompanying drawings in embodiments of this application are similar to what are described herein.

201: The network device sends configuration information to the terminal device, where the configuration information is used to configure a downlink reference signal resource set and a first uplink reference signal resource set associated with the downlink reference signal resource set.

The network device may send the configuration information by using radio resource control (RRC) signaling. Optionally, the configuration information is used to configure one or more downlink reference signal resource sets. The one or more downlink reference signal resource sets are associated with one first uplink reference signal resource set. One downlink reference signal resource set includes one or more downlink reference signal resources, and the first uplink reference signal resource set includes one or more uplink reference signal resources. Optionally, a downlink reference signal may be a channel state information reference signal (CSI-RS). When the CSI-RS is used for channel measurement, the CSI-RS may be referred to as a channel measurement resource (CMR). When the CSI-RS is used for interference measurement, the CSI-RS may be referred to as an interference measurement resource (IMR). Alternatively, the downlink reference signal may be a cell reference signal (CRS), a demodulation reference signal (DMRS), a multicast broadcast single frequency network (MBSFN) reference signal, a position reference signal (P-RS), or the like. An uplink reference signal may be a sounding reference signal (SRS) or a DMRS.

The configuration information may specifically have the following two forms.

Form 1: The configuration information is used to configure the downlink reference signal resource set and the first uplink reference signal resource set associated with the downlink reference signal resource set. The downlink reference signal resource set includes a channel measurement resource set used for channel measurement.

Figure 3:
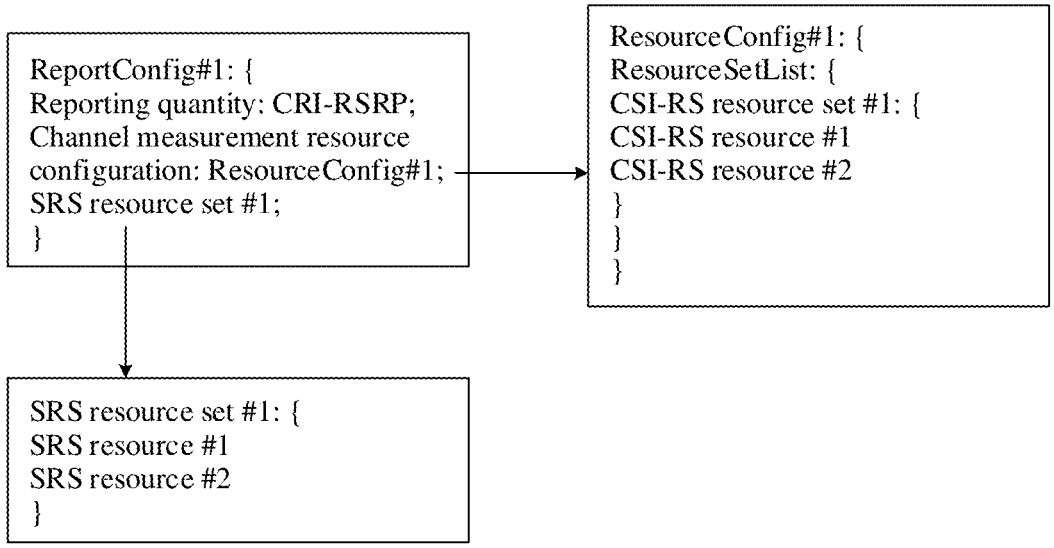
FIG. 3 is an example schematic diagram of configuration information according to an embodiment of this application.

Example 1: The downlink reference signal resource set is a CSI-RS resource set, and the first uplink reference signal resource set is an SRS resource set. As shown in FIG. 3, the network device sends one piece of configuration information by using RRC signaling, where the configuration information includes one reporting configuration (ReportConfig #1). A reporting quantity of the reporting configuration (ReportConfig #1) is CRI-RSRP (that is, channel state information reference signal resource indicator-reference signal received power, which may also be referred to as beam indicator-beam quality). In addition, the reporting configuration (ReportConfig #1) corresponds to a channel measurement resource configuration (ResourceConfig #1), and a function of ResourceConfig #1 is marked as channel measurement (resources for channel measurement).

The channel measurement resource configuration (ResourceConfig #1) includes one resource set list (ResourceSetList), and the resource set list includes M (M≥1) resource sets, for example, includes a CSI-RS resource set #1 (CSI-RS resource set #1). The CSI-RS resource set #1 (CSI-RS resource set #1) includes Y (Y≥1) CSI-RS resources. For example, the CSI-RS resource set #1 (CSI-RS resource set #1) includes a CSI-RS resource #1 (CSI-RS resource #1) and a CSI-RS resource #2 (CSI-RS resource #2). A resource set included in the channel measurement resource configuration is a downlink reference signal resource set.

The reporting configuration (ReportConfig #1) is associated with an SRS resource set #1 (SRS resource set #1), and a CSI-RS resource set included in the channel measurement resource configuration is associated with the SRS resource set #1. For example, the SRS resource set #1 includes Z (Z≥1) SRS resources, and the SRS resource set #1 includes an SRS resource #1 (SRS resource #1) and an SRS resource #2 (SRS resource #2).

Form 2: The configuration information is used to configure the downlink reference signal resource set and the first uplink reference signal resource set associated with the downlink reference signal resource set. The downlink reference signal resource set includes a channel measurement resource set and an interference measurement resource set.

Figure 4:
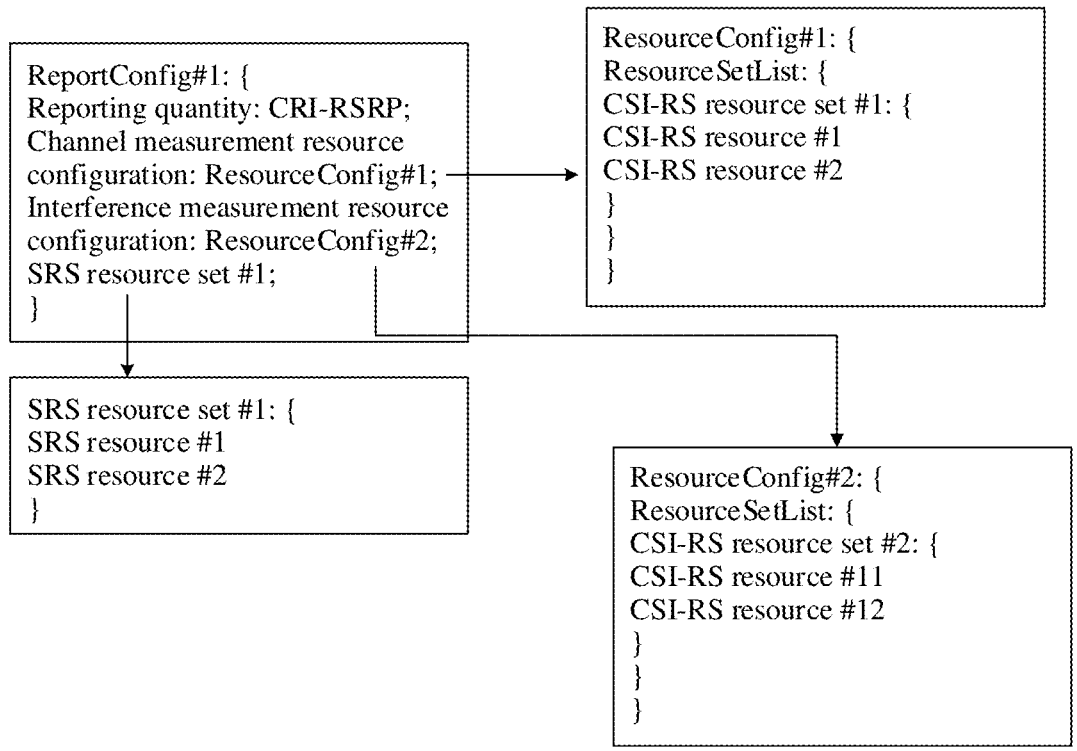
FIG. 4 is another example schematic diagram of configuration information according to an embodiment of this application.

Example 2: The downlink reference signal resource set is a CSI-RS resource set, and the first uplink reference signal resource set is an SRS resource set. As shown in FIG. 4, the network device configures that a reporting quantity of one reporting configuration (ReportConfig #1) is a channel state information reference signal resource indicator-signal to interference plus noise ratio (CRI-SINR). The reporting configuration (ReportConfig #1) corresponds to two resource configurations (ResourceConfig): a channel measurement resource configuration (ResourceConfig #1) and an interference measurement resource configuration (ResourceConfig #2). A function of the channel measurement resource configuration is marked as channel measurement (resources for channel measurement). A function of the interference measurement resource configuration is marked as interference measurement (resources for interference measurement).

ResourceConfig #1 includes one resource set list (ResourceSetList), and the resource set list includes M (M≥1) resource sets, for example, includes a CSI-RS resource set #1 (CSI-RS resource set #1). ResourceConfig #2 also includes one resource set list (ResourceSetList), and the resource set list includes N (N≥1) resource sets, for example, includes a CSI-RS resource set #2 (CSI-RS resource set #2). The CSI-RS resource set #1 (CSI-RS resource set #1) includes Y (Y≥1) channel measurement resources (CMR). For example, the CSI-RS resource set #1 (CSI-RS resource set #1) includes a CSI-RS resource #1 (CSI-RS resource #1) and a CSI-RS resource #2 (CSI-RS resource #2). The CSI-RS resource set #2 (CSI-RS resource set #2) includes Y (Y≥1) interference measurement resources (IMR). For example, the CSI-RS resource set #2 (CSI-RS resource set #2) includes a CSI-RS resource #11 (CSI-RS resource #11) and a CSI-RS resource #12 (CSI-RS resource #12). The CSI-RS resource #1 is associated with the CSI-RS resource #11, and the CSI-RS resource #2 is associated with the CSI-RS resource #12.

The reporting configuration (ReportConfig #1) is associated with an SRS resource set #1 (SRS resource set #1), and CSI-RS resource sets included in the channel measurement resource configuration (ResourceConfig #1) and the interference measurement resource configuration (ResourceConfig #2) are associated with the SRS resource set #1. For example, the SRS resource set #1 includes Z (Z≥1) SRS resources, and the SRS resource set #1 includes an SRS resource #1 (SRS resource #1) and an SRS resource #2 (SRS resource #2).

202: The network device sends a downlink reference signal to the terminal device based on the downlink reference signal resource set.

In this embodiment of this application, after sending the configuration information to the terminal device, the network device sends the downlink reference signal to the terminal device based on the downlink reference signal resource set.

203: The terminal device measures, based on the downlink reference signal resource set by using a first antenna panel of the terminal device, the downlink reference signal sent by the network device.

In this embodiment of this application, after receiving the configuration information sent by the network device, the terminal device measures, based on the downlink reference signal resource set by using the first antenna panel of the terminal device, the downlink reference signal sent by the network device.

204: The terminal device sends a first uplink reference signal to the network device based on the first uplink reference signal resource set by using a second antenna panel of the terminal device, where the first antenna panel is different from the second antenna panel.

In this embodiment of this application, after receiving the configuration information sent by the network device, the terminal device sends the first uplink reference signal to the network device based on the first uplink reference signal resource set by using the second antenna panel of the terminal device.

Operations 202 and 203 may be performed before, after, or simultaneously with operations 204 and 205.

205: The network device measures, based on the first uplink reference signal resource set, the first uplink reference signal sent by the terminal device.

In this embodiment of this application, after sending the configuration information to the terminal device, the network device measures, based on the first uplink reference signal resource set, the first uplink reference signal sent by the terminal device. Antenna panels used by the network device to send the downlink reference signal and measure the first uplink reference signal may be the same or different.

Figure 5:
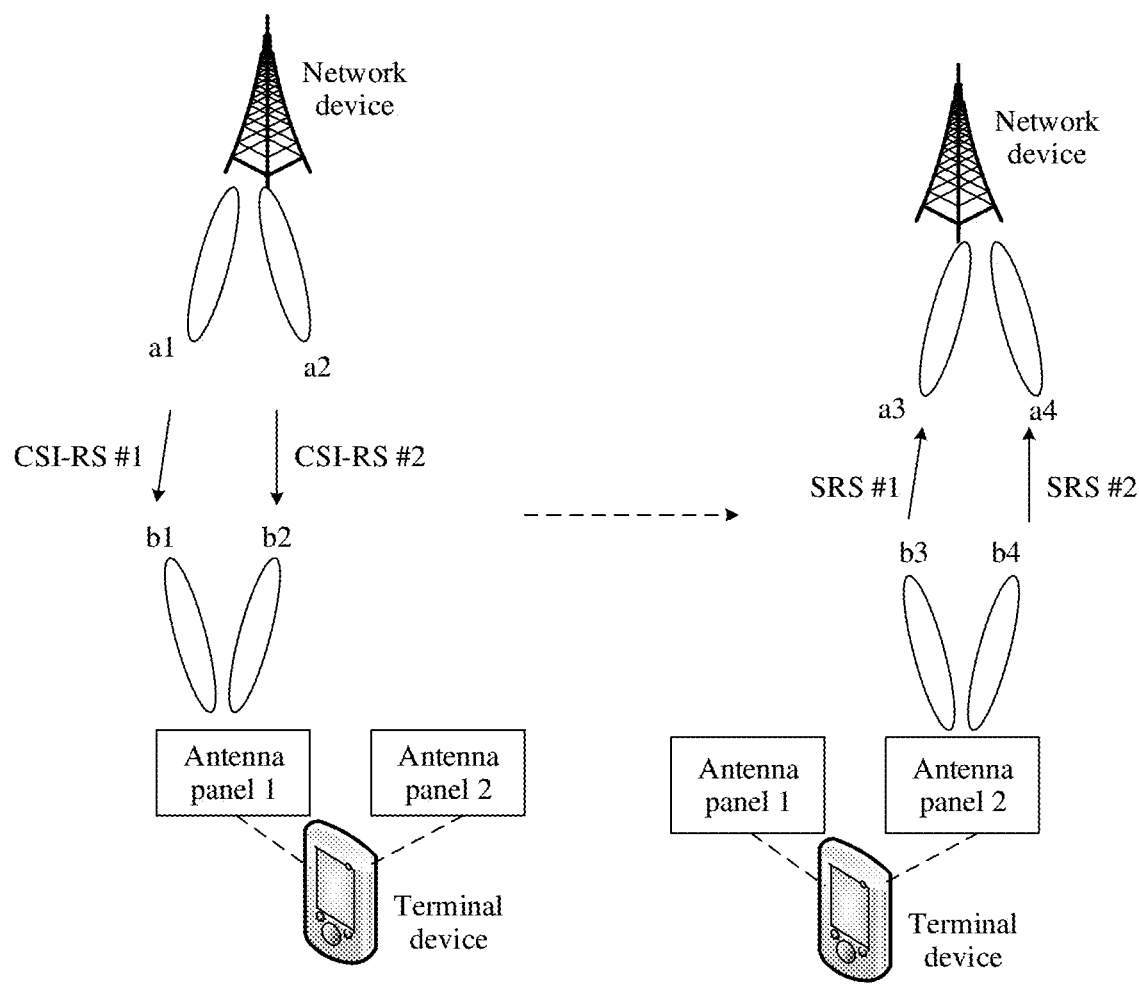
FIG. 5 is an example schematic diagram of a beam pair training process according to an embodiment of this application.

For example, the network device configures the downlink reference signal resource set and the first uplink reference signal resource set shown in FIG. 3. As shown in FIG. 5, the network device sends a CSI-RS #1 on a CSI-RS resource #1, and sends a CSI-RS #2 on a CSI-RS resource #2. Correspondingly, the terminal device measures the CSI-RS #1 on the CSI-RS resource #1 by using a reception beam b1 of an antenna panel 1. The terminal device measures the CSI-RS #2 on the CSI-RS resource #2 by using a reception beam b2 of the antenna panel 1. That is, the terminal device performs downlink beam training by using the antenna panel 1, to determine an optimal reception beam on the antenna panel 1.

In addition, the terminal device sends an SRS #1 on an SRS resource #1 by using a transmission beam b3 of an antenna panel 2. The terminal device sends an SRS #2 on an SRS resource #2 by using a transmission beam b4 of the antenna panel 2. Correspondingly, the network device measures the SRS #1 on the SRS resource #1, and measures the SRS #2 on the SRS resource #2. That is, the terminal device performs uplink beam training by using the antenna panel 2, to determine an optimal transmission beam on the antenna panel 2.

After the optimal reception beam and the optimal transmission beam of the terminal device are determined, a transmission beam corresponding to the optimal reception beam and the optimal transmission beam may be combined into a simultaneous-transmission beam pair of the terminal device. Alternatively, after the optimal reception beam and the optimal transmission beam of the terminal device are determined, a reception beam corresponding to the optimal transmission beam and the optimal reception beam may be combined into a simultaneous-reception beam pair of the terminal device. For example, if an optimal reception beam obtained through training on the antenna panel 1 is the reception beam b2, and the optimal transmission beam obtained through training on the antenna panel 2 is the transmission beam b4, a transmission beam corresponding to the reception beam b2 and the transmission beam b4 may be determined as a simultaneous-transmission beam pair of the terminal device, and a reception beam corresponding to the transmission beam b4 and the reception beam b2 may be determined as a simultaneous-reception beam pair of the terminal device. The transmission beam corresponding to the reception beam b2 is a transmission beam whose beam sending direction is the same as a beam receiving direction of the reception beam b2. Alternatively, the transmission beam corresponding to the reception beam b2 is a transmission beam that is transmitted by using a same spatial transmission filter as the reception beam b2. The reception beam corresponding to the transmission beam b4 is a reception beam whose beam receiving direction is the same as a beam sending direction of the transmission beam b4. Alternatively, the reception beam corresponding to the transmission beam b4 is a reception beam that is transmitted by using a same spatial transmission filter as the transmission beam b4.

In a possible implementation, the terminal device may report capability information, where the capability information indicates whether the terminal device supports the method described in the embodiment corresponding to FIG. 2.

In a possible implementation, as predefined in a protocol or as indicated by the network device, the terminal device may perform the method described in the embodiment corresponding to FIG. 2.

Based on the method described in FIG. 2, uplink beam training and downlink beam training can be performed by using different antenna panels of the terminal device, to obtain an optimal reception beam and an optimal transmission beam on the different antenna panels of the terminal device through training. In this way, a simultaneous-reception beam pair or a simultaneous-transmission beam pair including beams generated by the different antenna panels of the terminal device can be obtained based on the optimal reception beam and the optimal transmission beam on the different antenna panels of the terminal device. It can be learned that, based on the method described in FIG. 2, a simultaneous-reception beam pair or a simultaneous-transmission beam pair including beams generated by different antenna panels of the terminal device can be obtained through training.

Figure 6:
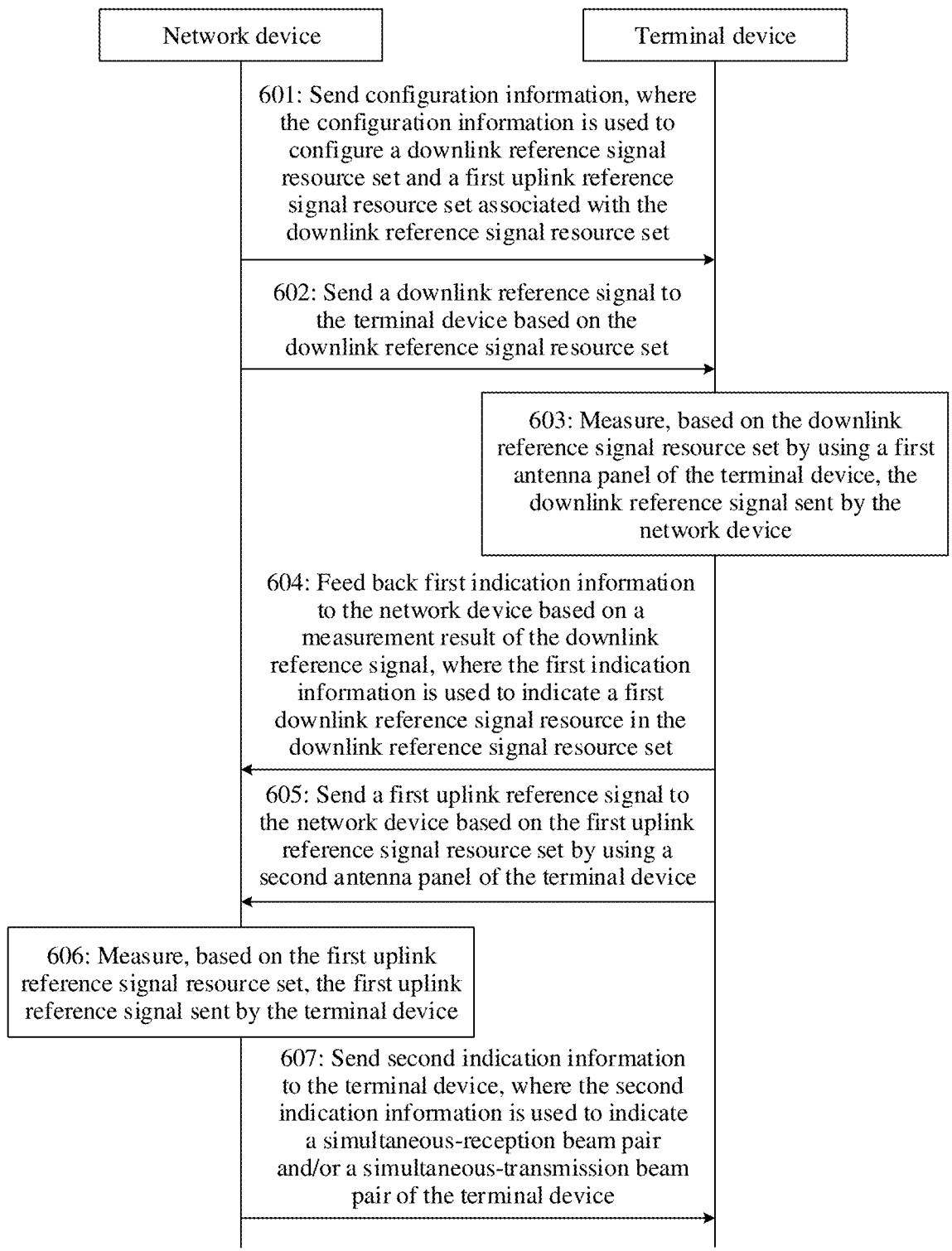
FIG. 6 is another example schematic flowchart of a beam pair training method according to an embodiment of this application.

FIG. 6 is another schematic flowchart of a beam pair training method according to an embodiment of this application. As shown in FIG. 6, the beam pair training method includes the following operations 601 to 607.

601: A network device sends configuration information to a terminal device, where the configuration information is used to configure a downlink reference signal resource set and a first uplink reference signal resource set associated with the downlink reference signal resource set.

602: The network device sends a downlink reference signal to the terminal device based on the downlink reference signal resource set.

603: The terminal device measures, based on the downlink reference signal resource set by using a first antenna panel of the terminal device, the downlink reference signal sent by the network device.

In this embodiment of this application, after receiving the configuration information sent by the network device, the terminal device measures, based on the downlink reference signal resource set by using the first antenna panel of the terminal device, the downlink reference signal sent by the network device.

For specific implementations of operations 601 to 603, refer to the foregoing operations 201 to 203.

604: The terminal device feeds back first indication information to the network device based on a measurement result of the downlink reference signal, where the first indication information includes information used to indicate a first downlink reference signal resource in the downlink reference signal resource set.

In this embodiment of this application, after measuring the downlink reference signal sent by the network device, the terminal device feeds back the first indication information to the network device based on the measurement result of the downlink reference signal. The first downlink reference signal resource is a downlink reference signal resource used for channel measurement. The first downlink reference signal resource may be a downlink reference signal resource that has best quality and that is used for channel measurement in the downlink reference signal resource set. Alternatively, the first downlink reference signal resource may be a downlink reference signal resource whose quality exceeds a threshold and that is used for channel measurement in the downlink reference signal resource set. This may be understood as that the first downlink reference signal resource is a downlink reference signal resource that is used for channel measurement and that corresponds to an optimal reception beam of the terminal device obtained through downlink beam training.

In a possible implementation, in addition to the information used to indicate the first downlink reference signal resource in the downlink reference signal resource set, the first indication information may further include one or more of the following three types of information:

1. information related to signal quality of a reference signal corresponding to the first downlink reference signal resource, where for example, the first indication information may further include reference signal received power (RSRP), a signal to interference plus noise ratio (SINR), or reference signal received quality (RSRQ);
2. information related to channel information obtained by the terminal device through measurement by using a reference signal corresponding to the first downlink reference signal resource, where for example, the first indication information may further include a rank indicator (RI), a precoding matrix indicator (PMI), a channel quality indicator (CQI), or a layer indicator (LI); and
3. information related to a downlink channel matrix obtained by the terminal device through measurement by using a reference signal corresponding to the first downlink reference signal resource, and/or information related to an uplink channel matrix corresponding to the downlink channel matrix, where for example, the first indication information may further include a rank, a determinant, or a trace of a matrix, or one or more elements, rows, columns, eigenvalues, or eigenvectors of the matrix.

In a possible implementation, the reception beam of the first downlink reference signal resource is a beam reference of a transmission beam used by the terminal device to send a first uplink reference signal.

605: The terminal device sends the first uplink reference signal to the network device based on the first uplink reference signal resource set by using a second antenna panel of the terminal device, where the first antenna panel is different from the second antenna panel.

In this embodiment of this application, after receiving the configuration information sent by the network device, the terminal device sends the first uplink reference signal to the network device based on the first uplink reference signal resource set by using the second antenna panel of the terminal device.

606: The network device measures, based on the first uplink reference signal resource set, the first uplink reference signal sent by the terminal device.

For specific implementations of operations 605 and 606, refer to the foregoing operations 204 and 205. Operations 604 and 605 may be performed before, after, or simultaneously with operations 602 to 604.

607: The network device sends second indication information to the terminal device.

In this embodiment of this application, after receiving the first indication information and measuring the first uplink reference signal, the network device sends the second indication information to the terminal device based on the first indication information and a measurement result of the first uplink reference signal. The second indication information is used to indicate a simultaneous-reception beam pair and/or a simultaneous-transmission beam pair of the terminal device, the simultaneous-reception beam pair includes a first reception beam and a second reception beam, the simultaneous-transmission beam pair includes a first transmission beam and a second transmission beam, the first reception beam is a reception beam of the first downlink reference signal resource, the second transmission beam is a transmission beam determined based on the measurement result of the first uplink reference signal, the second reception beam is a reception beam corresponding to the second transmission beam, and the first transmission beam is a transmission beam corresponding to the first reception beam. This may be understood as that the second transmission beam is an optimal transmission beam of the terminal device obtained through uplink beam training.

The reception beam of the first downlink reference signal resource may also be referred to as a reception beam corresponding to the first downlink reference signal resource, or a reception beam associated with the first downlink reference signal resource.

The reception beam corresponding to the second transmission beam is a reception beam whose beam receiving direction is the same as a beam sending direction of the second transmission beam. Alternatively, the reception beam corresponding to the second transmission beam is a reception beam that is transmitted by using a same spatial transmission filter as the second transmission beam. The transmission beam corresponding to the first reception beam is a transmission beam whose beam sending direction is the same as a beam receiving direction of the first reception beam. Alternatively, the transmission beam corresponding to the first reception beam is a transmission beam that is transmitted by using a same spatial transmission filter as the first reception beam.

Figure 7:
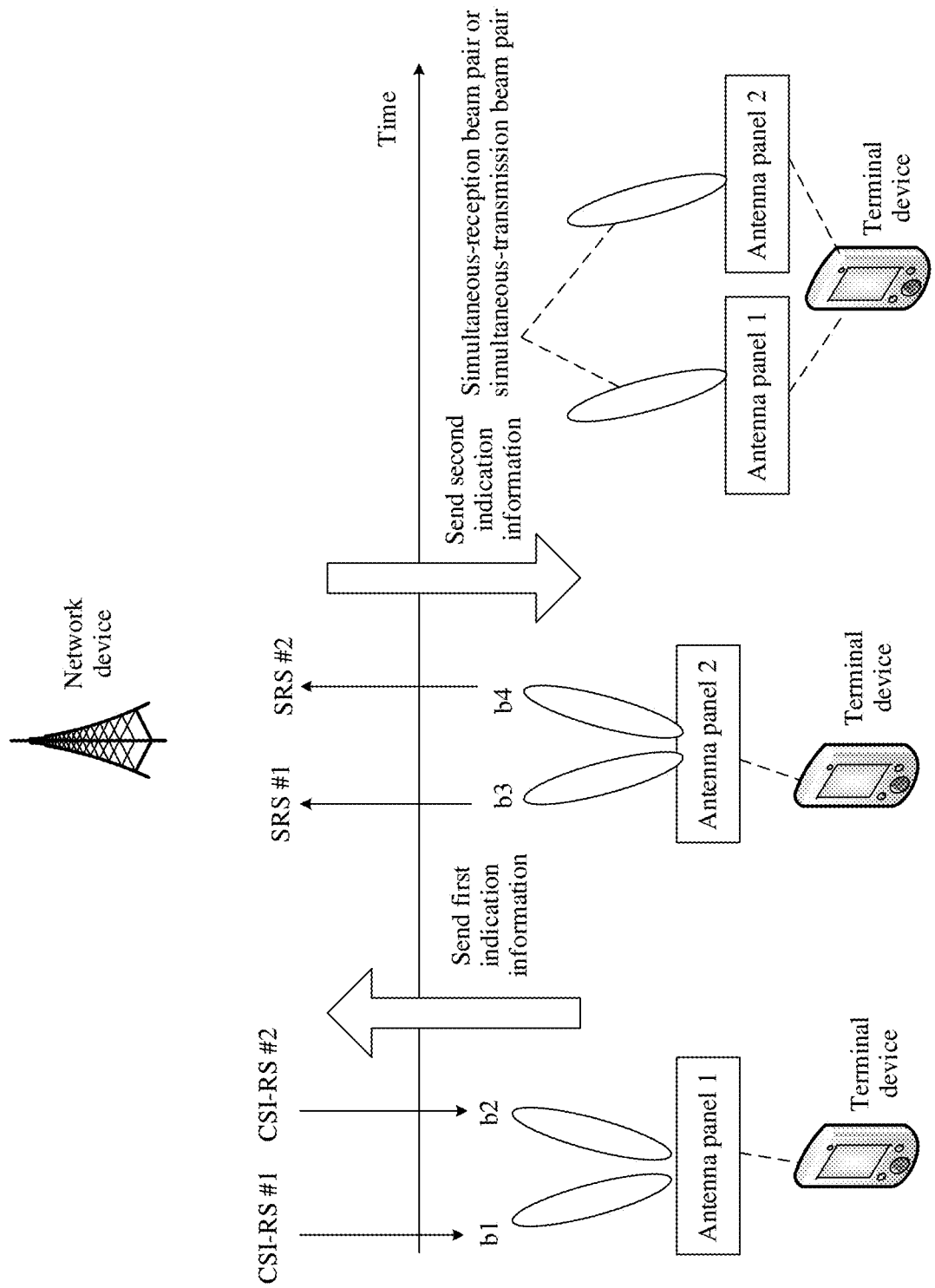
FIG. 7 is another example schematic diagram of a beam pair training process according to an embodiment of this application.

For example, the downlink reference signal resource set configured by the network device is the CSI-RS resource set #1 shown in FIG. 3, and the first uplink reference signal resource set configured by the network device is the SRS resource set #1 shown in FIG. 3. As shown in FIG. 7, the network device sends a CSI-RS #1 on a CSI-RS resource #1, and sends a CSI-RS #2 on a CSI-RS resource #2. Correspondingly, the terminal device measures the CSI-RS #1 on the CSI-RS resource #1 by using a reception beam b1 of an antenna panel 1. The terminal device measures the CSI-RS #2 on the CSI-RS resource #2 by using a reception beam b2 of the antenna panel 1. The terminal device determines, based on measurement results of the CSI-RS #1 and the CSI-RS #2, that the CSI-RS #1 has better received quality. Therefore, the terminal device sends first indication information to the network device, where the first indication information indicates the CSI-RS resource #1.

After the terminal device sends the first indication information to the network device, the terminal device sends an SRS #1 on an SRS resource #1 by using a transmission beam b3 of an antenna panel 2. The terminal device sends an SRS #2 on an SRS resource #2 by using a transmission beam b4 of the antenna panel 2. Correspondingly, the network device measures the SRS #1 on the SRS resource #1, and measures the SRS #2 on the SRS resource #2. The network device determines, based on measurement results of the SRS #1 and the SRS #2, that the SRS #1 has better quality. Therefore, the network device determines that the optimal transmission beam of the terminal device is the transmission beam b3 corresponding to the SRS resource #1.

When data transmission needs to be performed subsequently, the network device sends the second indication information to the terminal device based on the first indication information and the measurement result of the first uplink reference signal. The second indication information indicates the simultaneous-transmission beam pair and/or the simultaneous-reception beam pair of the terminal device. The simultaneous-transmission beam pair includes the transmission beam b3 and a transmission beam corresponding to the reception beam b1. The simultaneous-reception beam pair includes a reception beam corresponding to the transmission beam b3 and the reception beam b1. Specifically, the network device may indicate the simultaneous-reception beam pair and/or the simultaneous-transmission beam pair of the terminal device by using a transmission configuration index state (TCI state) identifier.

The following provides related descriptions of indicating the simultaneous-reception beam pair and/or the simultaneous-transmission beam pair of the terminal device by using the TCI state identifier in this embodiment of this application. Before the descriptions of indicating the simultaneous-reception beam pair and/or the simultaneous-transmission beam pair of the terminal device by using the TCI state identifier are provided, to facilitate understanding of a format of the second indication information provided in this embodiment of this application, a TCI state and quasi-co-location (QCL) in a current standard are first described.

1. TCI State Defined in the Current Standard:

The TCI state mainly includes a quasi-co-location type (for example, two different QCL types may be configured) and a reference signal of each QCL type. The reference signal specifically includes an identifier (ID) of a carrier component (CC) or an ID of a BWP in which the reference signal is located, and an index (ssb-index, or CSI-RS resource index) of each reference signal resource. As shown in FIG. 12, QCL types may be classified as follows:

QCL type A: indicates a delay, a Doppler shift, a delay spread, and a Doppler spread, that is, the QCL type A may be referred to as time-frequency offset information;

QCL type B: indicates a Doppler shift and a Doppler spread;

QCL type C: indicates a delay and a Doppler shift; and

QCL type D: indicates a spatial receive parameter, that is, a reception beam.

2. QCL Defined in the Current Standard:

The co-location relationship is used to indicate that a plurality of resources have one or more same or similar communication features. For a plurality of resources that have the co-location relationship, a same or similar communication configuration may be used. For example, if two antenna ports have the co-location relationship, a large-scale channel property in which one port sends a symbol may be inferred from a large-scale channel property in which the other port sends a symbol. The large-scale property may include a delay spread, an average delay, a Doppler spread, a Doppler shift, an average gain, a receive parameter, a reception beam number of the terminal, a transmit/receive channel correlation, an angle of arrival for reception, a spatial correlation of a receiver antenna, a dominant angle of arrival (AoA), an average angle of arrival, an AoA spread, and the like. A quasi-co-location parameter includes at least one of a Doppler spread, a Doppler shift, an average delay, a delay spread, and a space domain receive parameter. QCL relationships may be classified into four types: 'QCL-TypeA': {Doppler shift, Doppler spread, average delay, delay spread}; 'QCL-TypeB': {Doppler shift, Doppler spread}; 'QCL-TypeC': {Doppler shift, average delay}; and 'QCL-TypeD': {spatial receive parameter}.

The following provides related descriptions of indicating the simultaneous-reception beam pair of the terminal device by using the TCI state identifier in this embodiment of this application.

The network device may perform beam configuration by configuring a TCI state. The TCI state is usually configured by using RRC signaling. The network device may configure one or more TCI states. When needing to indicate the terminal device to perform beam switching, the network device may notify the terminal device of different TCI state identifiers (TCI state ID).

In a possible implementation, content included in a typical TCI state is shown in FIG. 13. A most related part is that a reference signal (referenceSignal) includes two reference signal resource identifiers. One is an uplink reference signal resource identifier SRS-ResourceId, for example, used to indicate the SRS resource #1. The other is a downlink reference signal resource identifier NZP-CSI-RS-ResourceId, for example, used to indicate the CSI-RS resource #1.

In addition, as shown in FIG. 13, a QCL type E is a QCL type newly defined for the method in this embodiment, and is used to indicate the simultaneous-reception beam pair. A transmission beam and a reception beam have consistency about a spatial parameter. In other words, the terminal device may be indicated to perform downlink receiving by using a reception beam corresponding to a transmission beam of an SRS. The downlink receiving herein includes but is not limited to receiving of a PDSCH, a PDCCH, a PDSCH-DMRS, a PDCCH-DMRS, and a CSI-RS. In this embodiment, the terminal device uses two antenna panels to separately receive a CSI-RS and send an SRS. Therefore, a reference signal resource identifier of the QCL type E may also include one CSI-RS resource identifier and one SRS resource identifier. Based on the implementation, content included in the TCI state is redefined, so that the TCI state identifier can indicate the simultaneous-reception beam pair.

In a possible implementation, the TCI state may further include information such as a TCI state ID, and a cell ID and a BWP ID of the reference signal.

In a possible implementation, when the TCI state is used for PDCCH receiving, in addition to configuring a plurality of TCI states in the RRC signaling, the terminal device may be further notified, by using medium access control-control element (MAC-CE) signaling, of a TCI state ID corresponding to which a TCI state needs to be used.

In a possible implementation, when the TCI state is used for PDSCH receiving, in addition to configuring a plurality of TCI states in the RRC signaling, the terminal device may be further notified, by using a TCI field in DCI, of a TCI state ID corresponding to which a TCI state needs to be used.

In a possible implementation, when the TCI state is used for CSI-RS receiving, in addition to configuring a plurality of TCI states in the RRC signaling, a qcl-info parameter of each CSI-RS resource may be specifically configured in the RRC signaling, to notify the terminal device of a TCI state ID corresponding to which a TCI state needs to be used to receive a specific CSI-RS resource.

The following provides related descriptions of indicating the simultaneous-transmission beam pair of the terminal device by using the TCI state identifier in this embodiment of this application.

The network device may perform beam configuration by configuring a TCI state. The TCI state is usually configured by using RRC signaling. The network device may configure one or more TCI states. When needing to indicate the terminal device to perform beam switching, the network device may notify the terminal device of different TCI state identifiers (TCI state ID).

Figures 14, 15:
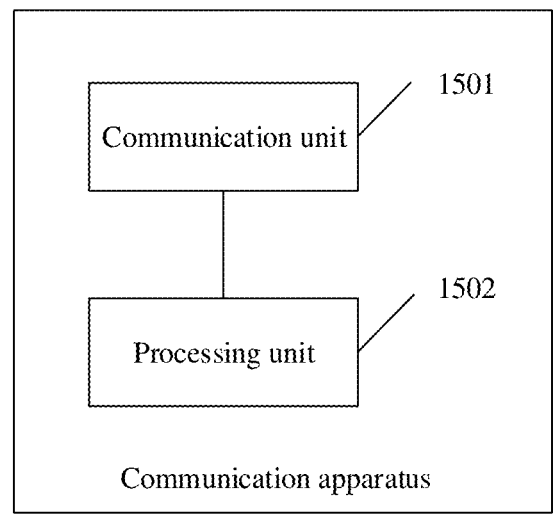
FIG. 14 is another example schematic diagram of a TCI state according to an embodiment of this application.
FIG. 15 is an example schematic diagram of a structure of a communication apparatus according to an embodiment of this application.

In a possible implementation, content included in a typical TCI state used for a PUSCH is shown in FIG. 14. A most related part is that a reference signal (referenceSignal) includes two reference signal resource identifiers. One is an uplink reference signal resource identifier SRS-ResourceId, for example, used to indicate the SRS resource #1. The other is a downlink reference signal resource identifier NZP-CSI-RS-ResourceId, for example, used to indicate the CSI-RS resource #1.

In addition, a QCL type F is a QCL type newly defined for the method in this embodiment, and is used to indicate the simultaneous-transmission beam pair. A transmission beam and a reception beam have consistency about a spatial parameter. In other words, the terminal device may be indicated to perform uplink sending by using a transmission beam corresponding to a reception beam of a downlink signal such as an SSB or a CSI-RS. The downlink receiving herein includes but is not limited to receiving of a PDSCH, a PDCCH, a PDSCH-DMRS, a PDCCH-DMRS, and a CSI-RS. In this embodiment, the terminal device uses two antenna panels to separately receive a CSI-RS and send an SRS. Therefore, a reference signal resource identifier of the QCL type F may also include one CSI-RS resource identifier and one SRS resource identifier. Based on the implementation, content included in the TCI state is redefined, so that the TCI state identifier can indicate the simultaneous-transmission beam pair.

In a possible implementation, the TCI state may further include information such as a TCI state ID, and a cell ID and a BWP ID of the reference signal.

In a possible implementation, when the TCI state is used for PUCCH sending, in addition to configuring a plurality of TCI states in the RRC signaling, the terminal device may be further notified, by using MAC CE signaling, of a TCI state ID corresponding to which a TCI state needs to be used.

In a possible implementation, when the TCI state is used for PUSCH sending, in addition to configuring a plurality of TCI states in the RRC signaling, the terminal may be further notified, by using a TCI field in DCI, of a TCI state ID corresponding to which a TCI state needs to be used.

Optionally, the terminal may be notified, by reusing an SRI field in the DCI, of a TCI state ID corresponding to which a TCI state needs to be used.

In a possible implementation, when the TCI state is used for SRS sending, in addition to configuring a plurality of TCI states in the RRC signaling, a transmission beam parameter of each SRS resource may be specifically configured in the RRC signaling. For example, a spatial relation parameter is used to notify the terminal of a TCI state ID corresponding to which a TCI state needs to be used to send a specific SRS resource.

In a possible implementation, the TCI state identifier used to indicate the simultaneous-transmission beam pair and the TCI state identifier used to indicate the simultaneous-reception beam pair may be a same TCI state identifier. In this case, the QCL type in the TCI state is used to indicate that a transmission beam and a reception beam have consistency about a spatial parameter.

In a possible implementation, operations 601 to 606 may be performed, and operation 607 may not be performed. In a possible implementation, alternatively, operation 604 may not be performed; in operation 607, the second indication information sent by the network device is used to indicate the second transmission beam. The terminal device may determine the simultaneous-transmission beam pair and/or the simultaneous-reception beam pair of the terminal device based on the reception beam of the first downlink reference signal resource and the second transmission beam.

It can be learned that, based on the method described in FIG. 6, a simultaneous-reception beam pair or a simultaneous-transmission beam pair including beams generated by different antenna panels of the terminal device can be obtained through training.

In a possible implementation, a transmission beam used to send the first uplink reference signal is determined based on the reception beam of the first downlink reference signal resource. In other words, a transmission beam used for uplink beam training is determined based on an optimal reception beam obtained through training. The transmission beam used to send the first uplink reference signal may be a transmission beam having highest correlation with the reception beam of the first downlink reference signal resource. In this way, the simultaneous-transmission beam pair and/or the simultaneous-reception beam pair obtained through training may be used to transmit same data, helping increase a transmission capacity. Alternatively, the transmission beam used to send the first uplink reference signal may be a transmission beam having lowest correlation with the reception beam of the first downlink reference signal resource. In this way, when the simultaneous-transmission beam pair and/or the simultaneous-reception beam pair obtained through training are/is used to transmit different data, data transmission reliability is improved.

For example, in FIG. 7, the transmission beam b3 used to send the SRS #1 and the transmission beam b4 used to send the SRS #2 are determined based on the reception beam b1. The transmission beam b3 and the transmission beam b4 may be transmission beams that have highest correlation with the reception beam b1 on the second antenna panel. For example, the transmission beam b3 and the transmission beam b4 may be two transmission beams adjacent to the reception beam b1 in space on the second antenna panel. Alternatively, the transmission beam b3 and the transmission beam b4 may be transmission beams that have lowest correlation with the reception beam b1 on the second antenna panel. For example, the transmission beam b3 and the transmission beam b4 may be two transmission beams that are farthest away from the reception beam b1 in space on the second antenna panel.

In a possible implementation, the downlink reference signal resource set includes a channel measurement resource set and an interference measurement resource set corresponding to the channel measurement resource set, the first downlink reference signal resource is a first channel measurement resource, the first channel measurement resource corresponds to a first interference measurement resource, and a transmission beam used to send the first uplink reference signal is determined based on a transmission beam used by the network device to send the first interference measurement resource. This implementation helps reduce interference between the simultaneous-reception beam pair and/or the simultaneous-transmission beam pair obtained through training.

For example, in this possible implementation, the downlink reference signal resource set includes a channel measurement resource set (namely, CSI-RS resource set #1) and an interference measurement resource set (namely, CSI-RS resource set #2) shown in FIG. 4. If the first downlink reference signal resource is a CSI-RS resource #1, the first interference measurement resource is a CSI-RS resource #12. The transmission beam b3 used to send the SRS #1 and the transmission beam b4 used to send the SRS #2 are determined based on a transmission beam used by the network device to send the CSI-RS resource #12. For example, a reception beam X that is of the terminal device and that corresponds to a transmission beam used by the network device to send the CSI-RS resource #12 may be first determined. Then, two beams that are on the second antenna panel and that have highest correlation with the reception beam X are used as transmission beams of the SRS #1 and the SRS #2.

In a possible implementation, the terminal device activates one of the first antenna panel and the second antenna panel at a same time point. In other words, the first antenna panel and the second antenna panel are not simultaneously activated. This helps reduce complexity and power consumption of the terminal device. Alternatively, the terminal device may simultaneously activate the first antenna panel and the second antenna panel. In this way, the simultaneous-transmission beam pair and/or the simultaneous-reception beam pair of the terminal device can be obtained more quickly through training.

In a possible implementation, a time offset between a last downlink reference signal resource in the downlink reference signal resource set and a $1^{st}$ uplink reference signal resource in the first uplink reference signal resource set is a preset value, or a time offset between a $1^{st}$ downlink reference signal resource in the downlink reference signal resource set and a last uplink reference signal resource in the first uplink reference signal resource set is a preset value, and the preset value is greater than or equal to an activation time period of an antenna panel of the terminal device. This implementation can ensure that the first antenna panel and the second antenna panel are not simultaneously activated. This helps reduce complexity and power consumption of the terminal device.

In a possible implementation, the configuration information is further used to indicate an antenna panel used to measure the downlink reference signal and/or an antenna panel used to send the first uplink reference signal. Optionally, the configuration information may indicate the antenna panel used to measure the downlink reference signal, and the antenna panel used to send the first uplink reference signal may be pre-specified in a protocol. Alternatively, the configuration information may indicate the antenna panel used to send the first uplink reference signal, and the antenna panel used to measure the downlink reference signal may be pre-specified in a protocol. Alternatively, the configuration information is used to indicate the antenna panel used to measure the downlink reference signal and the antenna panel used to send the first uplink reference signal. Based on the possible implementation, the terminal device can perform uplink beam training and downlink beam training by using different antenna panels.

Optionally, the terminal device may feed back an identifier (for example, a sequence number) of an antenna panel of the terminal device to the network device in advance. In this way, the network device can configure the antenna panel used to measure the downlink reference signal and/or the antenna panel used to send the first uplink reference signal.

Optionally, the network device may indicate, by using the configuration information, the antenna panel used to measure the downlink reference signal and/or the antenna panel used to send the first uplink reference signal. Alternatively, the network device may indicate, by using other signaling, the antenna panel used to measure the downlink reference signal and/or the antenna panel used to send the first uplink reference signal. In other words, signaling used by the network device to configure a reference signal resource set may be different from signaling used by the network device to indicate an antenna panel.

In a possible implementation, the configuration information is further used to indicate to use different antenna panels to measure the downlink reference signal and send the first uplink reference signal. In this possible implementation, the network device does not need to specify, to the terminal device, an antenna panel that is specifically used to measure the downlink reference signal and an antenna panel that is used to send the first uplink reference signal. The network device only needs to indicate the terminal device to measure the downlink reference signal and send the first uplink reference signal by using different antenna panels. Based on the possible implementation, the terminal device can perform uplink beam training and downlink beam training by using different antenna panels. Optionally, the network device may indicate, by using other signaling instead of the configuration information, to use different antenna panels to measure the downlink reference signal and send the first uplink reference signal.

In a possible implementation, the terminal device may report capability information, where the capability information indicates whether the terminal device supports the method described in the embodiment corresponding to FIG. 6.

In a possible implementation, as predefined in a protocol or as indicated by the network device, the terminal device may perform the method described in the embodiment corresponding to FIG. 6.

In a possible implementation, alternatively, operation 604 and operation 607 may not be performed. The network device sends third indication information to the terminal device. The third indication information is used to indicate an optimal transmission beam that is of the second antenna panel of the terminal device and that is obtained through uplink beam training or indicate a reception beam corresponding to the optimal transmission beam. After receiving the third indication information, the terminal device determines the simultaneous-transmission beam pair and/or the simultaneous-reception beam pair based on the third indication information and the first downlink reference signal resource (that is, a downlink reference signal resource corresponding to an optimal reception beam of the first antenna panel). For example, after performing downlink beam training by using the antenna panel 1, the terminal device determines that the reception beam b1 corresponding to the CSI-RS resource #1 is the optimal reception beam of the antenna panel 1. After the terminal device performs uplink beam training by using the antenna panel 2, the network device determines that the transmission beam b3 corresponding to the SRS resource #1 is the optimal transmission beam of the antenna panel 2. The network device sends third indication information to the terminal device, where the third indication information is used to indicate the transmission beam b3 or indicate the reception beam corresponding to the transmission beam b3. After receiving the third indication information, the terminal device determines that the reception beam b1 and the reception beam corresponding to the transmission beam b3 are a simultaneous-reception beam pair, and/or determines that the transmission beam b3 and the transmission beam corresponding to the reception beam b1 are a simultaneous-transmission beam pair. Based on the possible implementation, the network device needs to indicate only one beam to the terminal device, and the terminal device can accurately determine the simultaneous-transmission beam pair and/or the simultaneous-reception beam pair.

To enable the terminal device to perform simultaneous multi-panel reception/transmission, a plurality of beams that can be simultaneously used by the terminal device need to be determined in a beam training process. The plurality of beams are generated by different terminal antenna panels. Uplink and downlink joint beam training may be implemented by configuring one SRS resource set and CSI reporting associated thereto. Assuming that the terminal device has cross-antenna-panel beam consistency (that is, a reception beam of a terminal antenna panel 1 may be used to indicate a transmission beam of a terminal antenna panel 2, and vice versa), the terminal device may use one of the antenna panels to perform downlink beam measurement and reporting, and send an uplink SRS resource by using the other antenna panel, where for the transmission beam of the terminal device, refer to a reported downlink beam. The network device may determine, by selecting an optimal uplink beam that matches a downlink beam, a plurality of beams that can be used by the terminal device. (To enable simultaneous multi-panel transmission and reception, the beam training procedure needs to find a pair of beams generated by different UE panels. It can be done by using joint DL/UL beam training where one SRS resource set is associated with a CSI report. Assuming that beam correspondence holds across UE panels (i.e., the DL Rx beam of panel #1 can also be used to guide Tx beam of panel #2 and vice versa), UE can use one of its panels to measure the DL RSs to find the best DL beam and report, then, the UE sends the SRS resources using Tx beams on the other panel according to the reported beam. By selecting the best Tx beam pairing the reported DL beam, the gNB could determine simultaneous multi-beam for the UE.)

Proposal: To implement the simultaneous multi-panel transmission/reception function of the terminal, uplink and downlink joint beam training is supported (Proposal X: support joint DL/UL beam training for simultaneous multi-panel transmission and reception).

Figure 8:
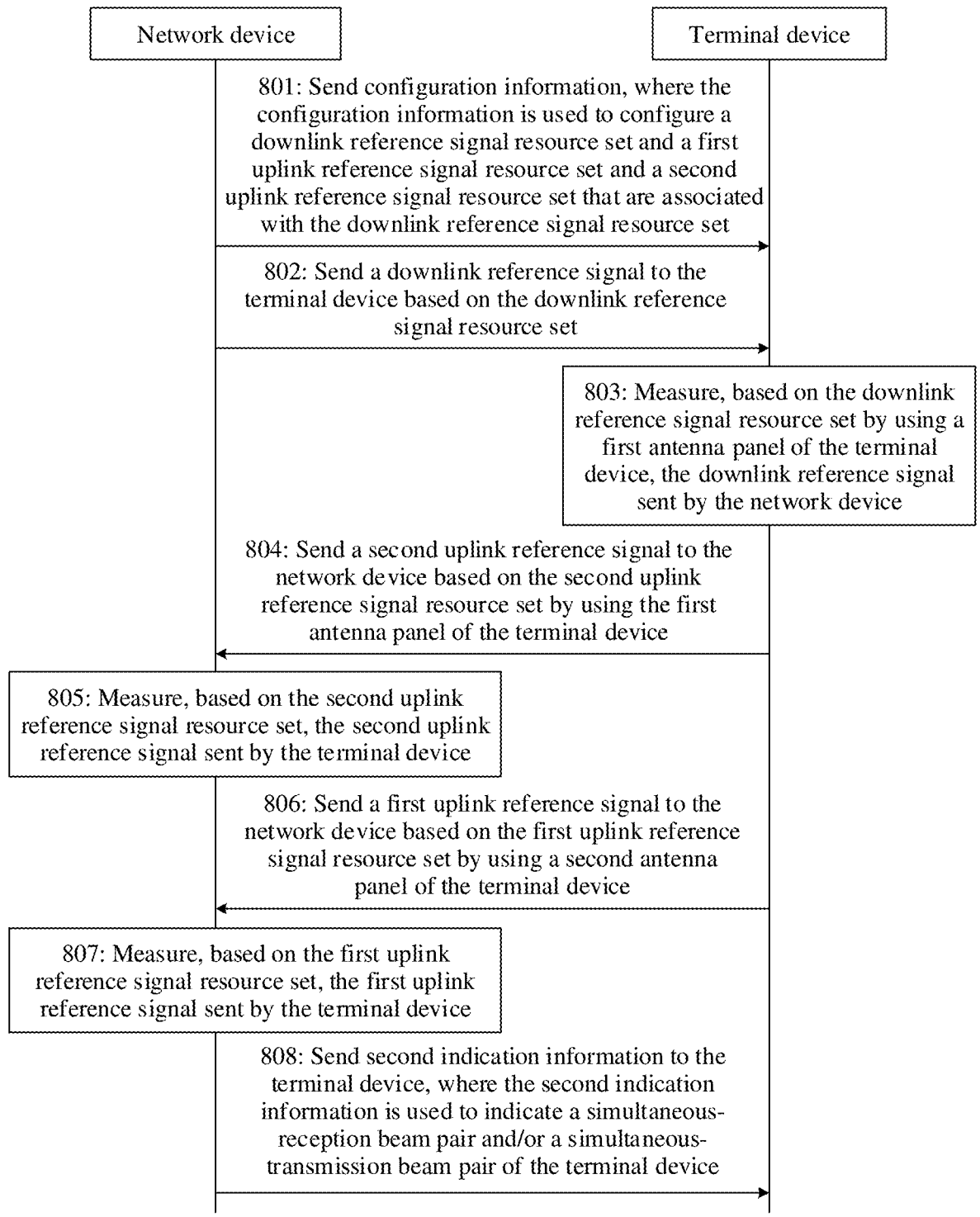
FIG. 8 is still another example schematic flowchart of a beam pair training method according to an embodiment of this application.

FIG. 8 is another schematic flowchart of a beam pair training method according to an embodiment of this application. As shown in FIG. 8, the beam pair training method includes the following operations 801 to 808.

801: A network device sends configuration information to a terminal device, where the configuration information is used to configure a downlink reference signal resource set and a first uplink reference signal resource set and a second uplink reference signal resource set that are associated with the downlink reference signal resource set.

For related descriptions of the downlink reference signal resource set and the first uplink reference signal resource set, refer to the descriptions in the embodiment corresponding to FIG. 2. The second uplink reference signal resource set is similar to the first uplink reference signal resource set.

In the embodiment described in FIG. 8, the configuration information may have the following two forms:

Form 1: The configuration information is used to configure the downlink reference signal resource set and the first uplink reference signal resource set and the second uplink reference signal resource set that are associated with the downlink reference signal resource set. The downlink reference signal resource set includes a channel measurement resource set used for channel measurement.

Figure 9:
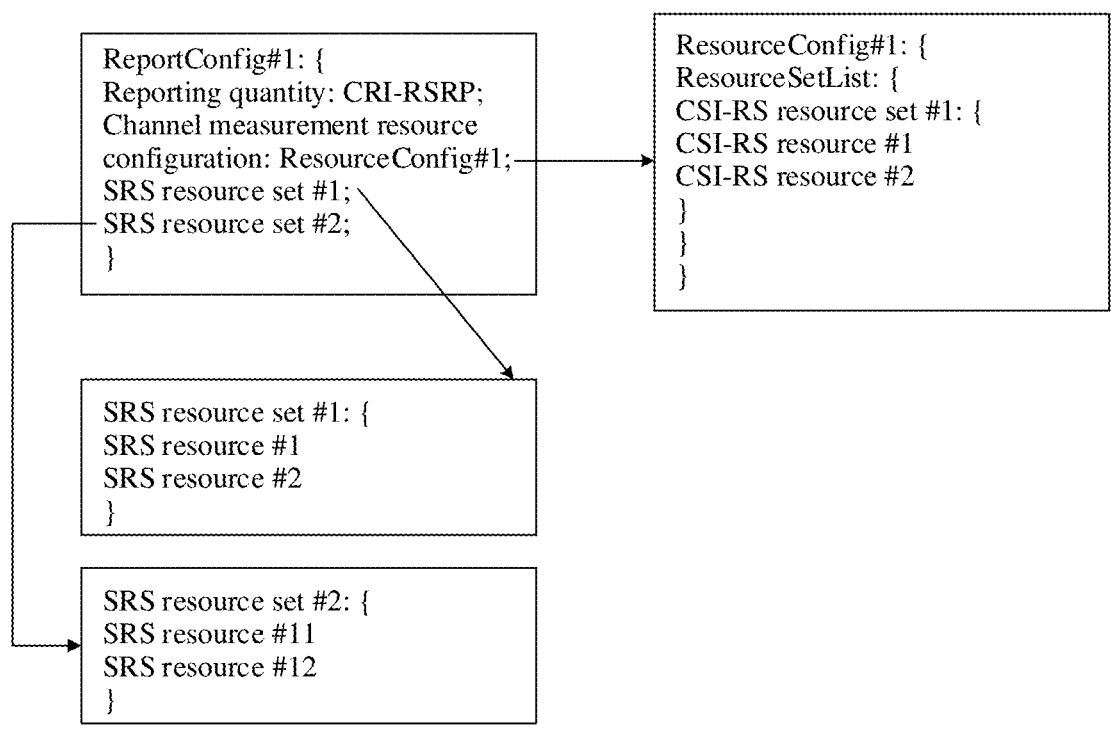
FIG. 9 is still another example schematic diagram of configuration information according to an embodiment of this application.

For example, the downlink reference signal resource set is a CSI-RS resource set, and the first uplink reference signal resource set and the second uplink reference signal resource set are SRS resource sets. As shown in FIG. 9, the network device sends one piece of configuration information by using RRC signaling, where the configuration information includes one reporting configuration (ReportConfig #1). A reporting quantity of the reporting configuration (ReportConfig #1) is CRI-RSRP (that is, a beam indicator-beam quality, which may also be referred to as a channel state information reference signal resource indicator-reference signal received power). In addition, the reporting configuration (ReportConfig #1) corresponds to a channel measurement resource configuration (ResourceConfig #1), and a function of ResourceConfig #1 is marked as channel measurement (resources for channel measurement). For descriptions of the channel measurement resource configuration (ResourceConfig #1), refer to the descriptions of the embodiment corresponding to FIG. 3.

The reporting configuration (ReportConfig #1) is associated with an SRS resource set #1 (SRS resource set #1) and an SRS resource set #2 (SRS resource set #2), and a CSI-RS resource set included in the channel measurement resource configuration is associated with the SRS resource set #1 and the SRS resource set #2. The SRS resource set #1 (SRS resource set #1) is the first uplink reference signal resource set, and the SRS resource set #2 (SRS resource set #2) is the second uplink reference signal resource set. The SRS resource set #1 includes $Z$ ($Z \geq 1$) SRS resources. For example, the SRS resource set #1 includes an SRS resource #1 (SRS resource #1) and an SRS resource #2 (SRS resource #2). The SRS resource set #2 includes $Z$ ($Z \geq 1$) SRS resources. For example, the SRS resource set #2 includes an SRS resource #11 (SRS resource #11) and an SRS resource #12 (SRS resource #12).

Form 2: The configuration information is used to configure the downlink reference signal resource set and the first uplink reference signal resource set and the second uplink reference signal resource set that are associated with the downlink reference signal resource set. The downlink reference signal resource set includes a channel measurement resource set used for channel measurement and an interference measurement resource set used for interference measurement.

Figure 10:
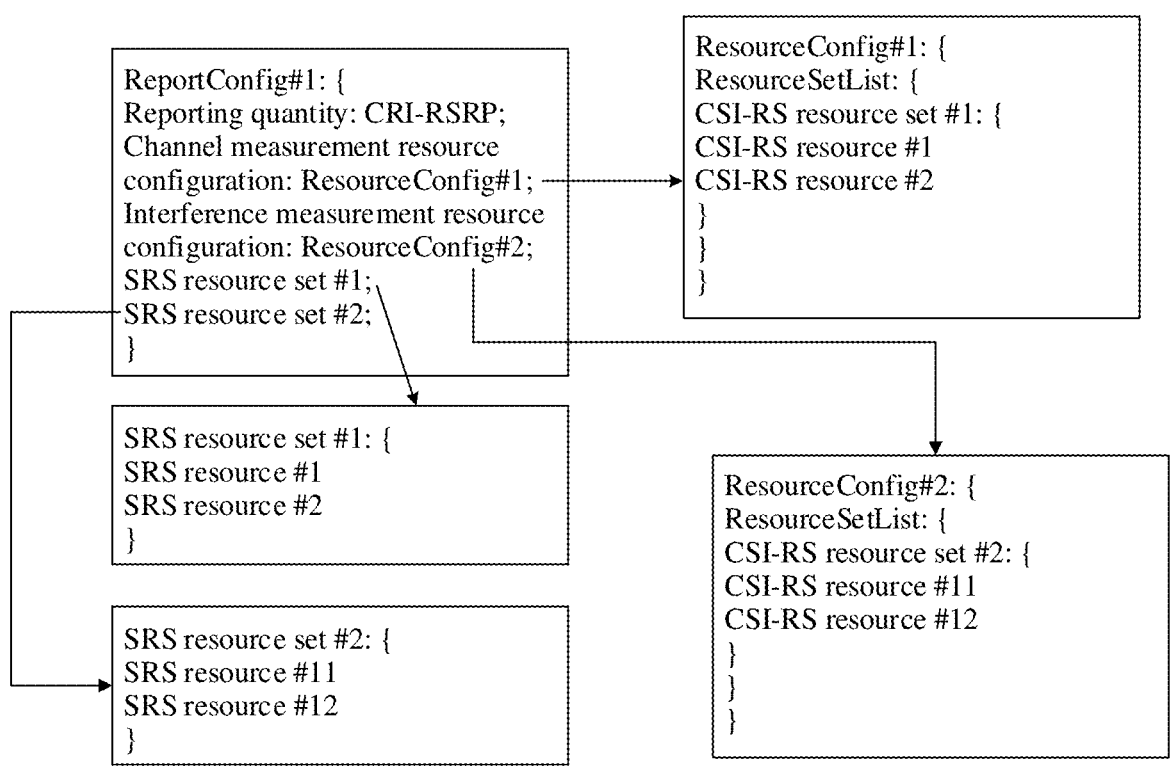
FIG. 10 is still another example schematic diagram of configuration information according to an embodiment of this application.

For example, the downlink reference signal resource set is a CSI-RS resource set, and the first uplink reference signal resource set and the second uplink reference signal resource set are SRS resource sets. As shown in FIG. 10, the network device configures that a reporting quantity of one reporting configuration (ReportConfig #1) is a channel state information reference signal resource indicator-signal to interference plus noise ratio (CRI-SINR). The reporting configuration (ReportConfig #1) corresponds to two resource configurations (ResourceConfig): a channel measurement resource configuration (ResourceConfig #1) and an interference measurement resource configuration (ResourceConfig #2). A function of the channel measurement resource configuration is marked as channel measurement (resources for channel measurement). A function of the interference measurement resource configuration is marked as interference measurement (resources for interference measurement). For descriptions of the channel measurement resource configuration (ResourceConfig #1) and the interference measurement resource configuration (ResourceConfig #2), refer to the descriptions of the embodiment corresponding to FIG. 4.

The reporting configuration (ReportConfig #1) is associated with an SRS resource set #1 (SRS resource set #1) and an SRS resource set #2 (SRS resource set #2). That is, a CSI-RS resource set included in the channel measurement resource configuration is associated with the SRS resource set #1 and the SRS resource set #2. The SRS resource set #1 (SRS resource set #1) is the first uplink reference signal resource set, and the SRS resource set #2 (SRS resource set #2) is the second uplink reference signal resource set. The SRS resource set #1 includes Z (Z≥1) SRS resources. For example, the SRS resource set #1 includes an SRS resource #1 (SRS resource #1) and an SRS resource #2 (SRS resource #2). The SRS resource set #2 includes Z (Z≥1) SRS resources. For example, the SRS resource set #2 includes an SRS resource #11 (SRS resource #11) and an SRS resource #12 (SRS resource #12).

802: The network device sends a downlink reference signal to the terminal device based on the downlink reference signal resource set.

803: The terminal device measures, based on the downlink reference signal resource set by using a first antenna panel of the terminal device, the downlink reference signal sent by the network device.

In this embodiment of this application, after receiving the configuration information sent by the network device, the terminal device measures, based on the downlink reference signal resource set by using the first antenna panel of the terminal device, the downlink reference signal sent by the network device. For specific implementations of operations 802 and 803, refer to the foregoing operations 202 and 203.

804: The terminal device sends a second uplink reference signal to the network device based on the second uplink reference signal resource set by using the first antenna panel, where a transmission beam used to send the second uplink reference signal is determined based on a reception beam of a first downlink reference signal resource, and the first downlink reference signal resource is determined from the downlink reference signal resource set based on a measurement result of the downlink reference signal.

For descriptions of the first downlink reference signal resource, refer to the descriptions in the embodiment corresponding to FIG. 6.

In a possible implementation, the transmission beam used by the terminal device to send the second uplink reference signal on the first antenna panel may be a transmission beam that has highest correlation with the reception beam of the first downlink reference signal resource. In this way, beam training can be enhanced in a direction of an optimal reception beam.

805: The network device measures, based on the second uplink reference signal resource set, the second uplink reference signal sent by the terminal device.

806: The terminal device sends a first uplink reference signal to the network device based on the first uplink reference signal resource set by using a second antenna panel of the terminal device, where the first antenna panel is different from the second antenna panel.

807: The network device measures, based on the first uplink reference signal resource set, the first uplink reference signal sent by the terminal device.

Operations 802 to 805 may be performed before, after, or simultaneously with operations 806 and 807.

808: The network device sends second indication information to the terminal device.

In this embodiment of this application, after measuring the first uplink reference signal and the second uplink reference signal, the network device sends the second indication information to the terminal device based on the first indication information and a measurement result of the first uplink reference signal. The second indication information is used to indicate a simultaneous-reception beam pair and/or a simultaneous-transmission beam pair of the terminal device, the simultaneous-transmission beam pair includes a first transmission beam and a second transmission beam, the simultaneous-reception beam pair includes a first reception beam corresponding to the first transmission beam and a second reception beam corresponding to the second transmission beam, the first transmission beam is a transmission beam determined by the network device based on the measurement result of the first uplink reference signal, and the second transmission beam is a transmission beam determined by the network device based on a measurement result of the second uplink reference signal.

The reception beam corresponding to the first transmission beam is a reception beam whose beam receiving direction is the same as a beam sending direction of the first transmission beam. Alternatively, the reception beam corresponding to the first transmission beam is a reception beam that is transmitted by using a same spatial transmission filter as the first transmission beam.

The reception beam corresponding to the second transmission beam is similar to what are described herein.

Figure 11:
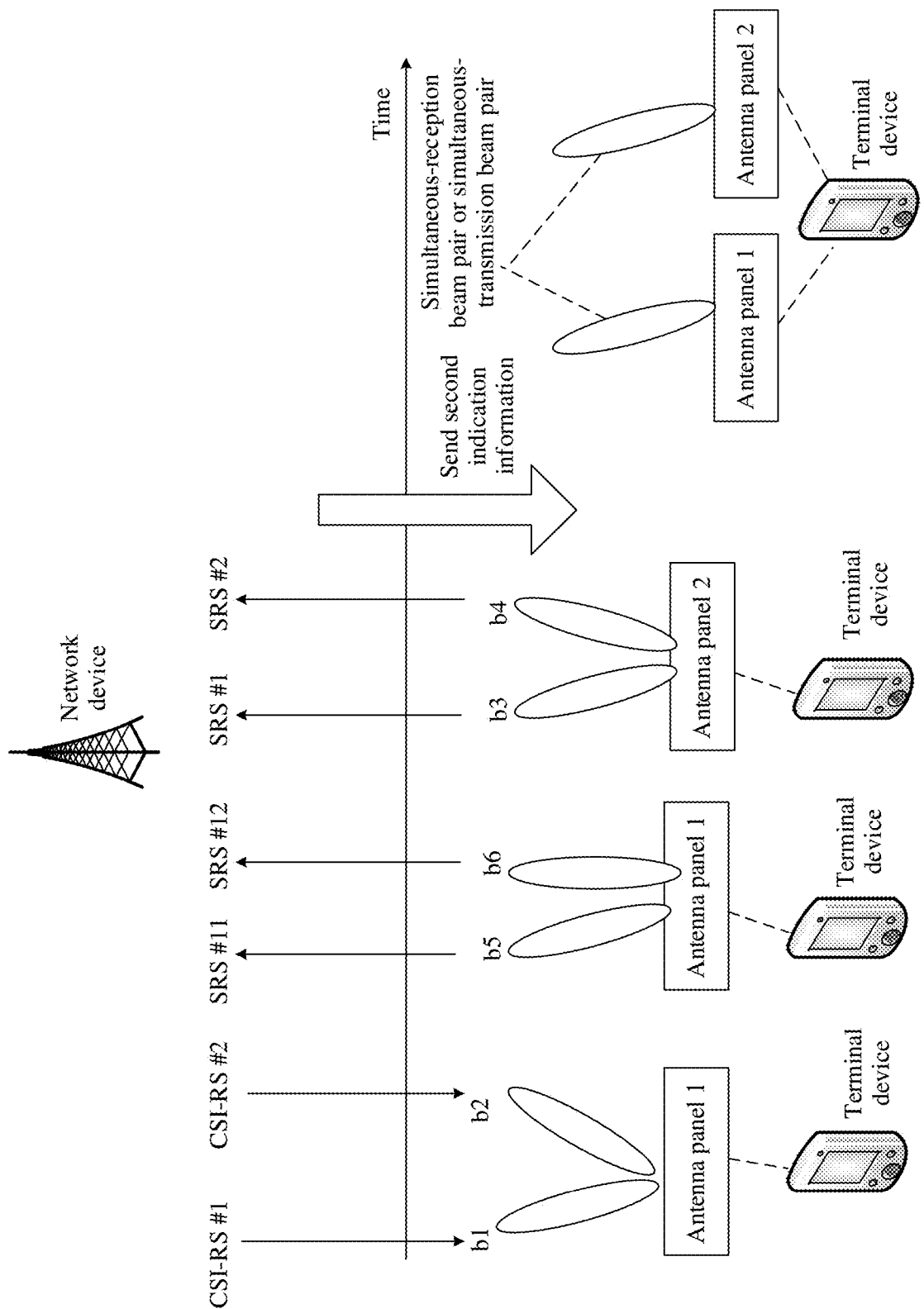
FIG. 11 is still another example schematic diagram of a beam pair training process according to an embodiment of this application.

For example, the downlink reference signal resource set configured by the network device is a CSI-RS resource set #1 shown in FIG. 9, the first uplink reference signal resource set configured by the network device is an SRS resource set #1 shown in FIG. 9, and the second uplink reference signal resource set configured by the network device is an SRS resource set #2 shown in FIG. 9. As shown in FIG. 11, the network device sends a CSI-RS #1 on a CSI-RS resource #1, and sends a CSI-RS #2 on a CSI-RS resource #2. Correspondingly, the terminal device measures the CSI-RS #1 on the CSI-RS resource #1 by using a reception beam b1 of an antenna panel 1. The terminal device measures the CSI-RS #2 on the CSI-RS resource #2 by using a reception beam b2 of the antenna panel 1. The terminal device determines, based on measurement results of the CSI-RS #1 and the CSI-RS #2, that the CSI-RS #1 has better received quality. Therefore, the first downlink reference signal resource is the CSI-RS resource #1. The terminal device determines transmission beams of an SRS resource #11 and an SRS resource #12 based on the reception beam b1 of the CSI-RS resource #1. For example, as shown in FIG. 11, the terminal device determines, based on the reception beam b1 of the CSI-RS resource #1, that the transmission beams of the SRS resource #11 and the SRS resource #12 are transmission beams b5 and b6 respectively. The terminal device sends an SRS #11 on the SRS resource #11 by using the transmission beam b5 of the antenna panel 1. The terminal device sends an SRS #12 on the SRS resource #12 by using the transmission beam b6 of an antenna panel 2. Correspondingly, the network device measures the SRS #11 on the SRS resource #11, and measures the SRS #12 on the SRS resource #12. The network device determines, based on measurement results of the SRS #11 and the SRS #12, that the SRS #11 has better quality. Therefore, the network device determines that an optimal transmission beam on the first antenna panel of the terminal device is the transmission beam b5 of the SRS resource #11.

The terminal device sends an SRS #1 on an SRS resource #1 by using a transmission beam b3 of the antenna panel 2. The terminal device sends an SRS #2 on an SRS resource #2 by using a transmission beam b4 of the antenna panel 2. Correspondingly, the network device measures the SRS #1 on the SRS resource #1, and measures the SRS #2 on the SRS resource #2. The network device determines, based on measurement results of the SRS #1 and the SRS #2, that the SRS #1 has better quality. Therefore, the network device determines that an optimal transmission beam on the second antenna panel of the terminal device is the transmission beam b3 corresponding to the SRS resource #1.

When data transmission needs to be performed subsequently, the network device sends the second indication information to the terminal device based on the measurement results of the first uplink reference signal and the second uplink reference signal. The second indication information indicates the simultaneous-transmission beam pair and/or the simultaneous-reception beam pair of the terminal device. The simultaneous-transmission beam pair includes the transmission beam b5 and the transmission beam b3. The simultaneous-reception beam pair includes a reception beam corresponding to the transmission beam b5 and a reception beam corresponding to the transmission beam b3. Specifically, the network device may indicate the simultaneous-reception beam pair and/or the simultaneous-transmission beam pair of the terminal device by using a TCI state identifier. For a specific implementation in which the network device indicates the simultaneous-reception beam pair and/or the simultaneous-transmission beam pair of the terminal device by using the TCI state identifier, refer to the foregoing descriptions.

In a possible implementation, operations 801 to 807 may be performed, and operation 808 may not be performed.

An optimal reception beam found by the terminal device through downlink beam training is not necessarily suitable to be used as one of transmission beams in an uplink simultaneous-transmission beam pair. For example, when the terminal does not have reception and transmission beam consistency, an optimal reception beam found through downlink beam training is not necessarily suitable to be used as one of transmission beams in an uplink simultaneous-transmission beam pair. Therefore, in the method described in FIG. 8, uplink beam training is also performed on an optimal reception beam for sending. This helps obtain, through training, an optimal terminal-side simultaneous-transmission beam pair and/or simultaneous-reception beam pair.

In a possible implementation, a transmission beam used to send the first uplink reference signal is determined based on the reception beam of the first downlink reference signal resource. In other words, a transmission beam used for uplink beam training is determined based on an optimal reception beam obtained through training. The transmission beam used to send the first uplink reference signal may be a transmission beam having highest correlation with the reception beam of the first downlink reference signal resource. In this way, the simultaneous-transmission beam pair and/or the simultaneous-reception beam pair obtained through training may be used to transmit same data, helping increase a transmission capacity. Alternatively, the transmission beam used to send the first uplink reference signal may be a transmission beam having lowest correlation with the reception beam of the first downlink reference signal resource. In this way, when the simultaneous-transmission beam pair and/or the simultaneous-reception beam pair obtained through training are/is used to transmit different data, data transmission reliability is improved.

In a possible implementation, the downlink reference signal resource set includes a channel measurement resource set and an interference measurement resource set corresponding to the channel measurement resource set, the first downlink reference signal resource is a first channel measurement resource, the first channel measurement resource corresponds to a first interference measurement resource, and a transmission beam used to send the first uplink reference signal is determined based on a transmission beam used by the network device to send the first interference measurement resource. This implementation helps reduce interference between the simultaneous-reception beam pair and/or the simultaneous-transmission beam pair obtained through training.

In a possible implementation, a time point at which the first uplink reference signal is sent is the same as a time point at which the second uplink reference signal is sent. Based on this possible implementation, the network device can more accurately determine the simultaneous-transmission beam pair and/or the simultaneous-reception beam pair of the terminal device.

In a possible implementation, the configuration information is further used to indicate an antenna panel used to measure the downlink reference signal and an antenna panel used to send the second uplink reference signal and/or indicate an antenna panel used to send the first uplink reference signal. Optionally, the configuration information may indicate the antenna panel used to measure the downlink reference signal and the antenna panel used to send the second uplink reference signal, and the antenna panel used to send the first uplink reference signal may be pre-specified in a protocol. Alternatively, the configuration information may indicate the antenna panel used to send the first uplink reference signal, and the antenna panel used to measure the downlink reference signal and the antenna panel used to send the second uplink reference signal may be pre-specified in a protocol. Alternatively, the configuration information is used to indicate the antenna panel used to measure the downlink reference signal, the antenna panel used to send the second uplink reference signal, and the antenna panel used to send the first uplink reference signal. Based on the possible implementation, the terminal device can perform uplink beam training and downlink beam training by using different antenna panels.

Optionally, the terminal device may feed back an identifier (for example, a sequence number) of an antenna panel of the terminal device to the network device in advance. In this way, the network device can configure the antenna panel used to measure the downlink reference signal and the antenna panel used to send the second uplink reference signal, and/or the antenna panel used to send the first uplink reference signal.

Optionally, the network device may indicate, by using the configuration information, the antenna panel used to measure the downlink reference signal and the antenna panel used to send the second uplink reference signal, and/or the antenna panel used to send the first uplink reference signal. Alternatively, the network device may indicate, by using other signaling, the antenna panel used to measure the downlink reference signal and the antenna panel used to send the second uplink reference signal, and/or the antenna panel used to send the first uplink reference signal. In other words, signaling used by the network device to configure a reference signal resource set may be different from signaling used by the network device to indicate an antenna panel.

In a possible implementation, the configuration information is further used to indicate to use a same antenna panel to measure the downlink reference signal and send the second uplink reference signal, and indicate the terminal device to send the first uplink reference signal and the second uplink reference signal by using different antenna panels. Based on the possible implementation, the terminal device can perform uplink beam training and downlink beam training by using different antenna panels. Optionally, the network device may indicate, by using other signaling instead of the configuration information, the terminal device to use a same antenna panel to measure the downlink reference signal and send the second uplink reference signal, and to use different antenna panels to send the first uplink reference signal and the second uplink reference signal.

In a possible implementation, the terminal device may report capability information, where the capability information indicates whether the terminal device supports the method described in the embodiment corresponding to FIG. 8.

In a possible implementation, as predefined in a protocol or as indicated by the network device, the terminal device may perform the method described in the embodiment corresponding to FIG. 8.

FIG. 15 is a schematic diagram of a structure of a communication apparatus according to an embodiment of this application. The communication apparatus shown in FIG. 15 may be configured to perform some or all functions of the terminal device in the method embodiment described in FIG. 2, FIG. 6, or FIG. 8. The apparatus may be a terminal device, an apparatus in the terminal device, or an apparatus that can be used together with the terminal device. The communication apparatus may alternatively be a chip system. The communication apparatus shown in FIG. 15 may include a communication unit 1501 and a processing unit 1502. The processing unit 1502 is configured to process data. A receiving unit and a sending unit are integrated into the communication unit 1501. Alternatively, the communication unit 1501 may be split into a receiving unit and a sending unit. The communication unit 1501 may also be referred to as a transceiver unit. The communication unit 1501 described below is similar to what are described herein.

The communication unit 1501 is configured to receive configuration information sent by a network device, where the configuration information is used to configure a downlink reference signal resource set and a first uplink reference signal resource set associated with the downlink reference signal resource set. The communication unit 1501 is further configured to measure, based on the downlink reference signal resource set by using a first antenna panel of the communication apparatus, a downlink reference signal sent by the network device. The communication unit 1501 is further configured to send a first uplink reference signal to the network device based on the first uplink reference signal resource set by using a second antenna panel of the communication apparatus, where the first antenna panel is different from the second antenna panel.

In a possible implementation, the communication unit 1501 is further configured to feed back first indication information to the network device based on a measurement result of the downlink reference signal, where the first indication information includes information used to indicate a first downlink reference signal resource in the downlink reference signal resource set. The communication unit 1501 is further configured to: after sending the first uplink reference signal to the network device based on the first uplink reference signal resource set by using the second antenna panel of the communication apparatus, receive second indication information sent by the network device, where the second indication information is used to indicate a simultaneous-reception beam pair and/or a simultaneous-transmission beam pair of the communication apparatus, the simultaneous-reception beam pair includes a first reception beam and a second reception beam, the simultaneous-transmission beam pair includes a first transmission beam and a second transmission beam, the first reception beam is a reception beam of the first downlink reference signal resource, the second transmission beam is a transmission beam determined by the network device based on a measurement result of the first uplink reference signal, the second reception beam is a reception beam corresponding to the second transmission beam, and the first transmission beam is a transmission beam corresponding to the first reception beam.

In a possible implementation, a transmission beam used to send the first uplink reference signal is determined based on the reception beam of the first downlink reference signal resource.

In a possible implementation, the downlink reference signal resource set includes a channel measurement resource set and an interference measurement resource set corresponding to the channel measurement resource set, the first downlink reference signal resource is a first channel measurement resource, the first channel measurement resource corresponds to a first interference measurement resource, and a transmission beam used to send the first uplink reference signal is determined based on a transmission beam used by the network device to send the first interference measurement resource.

In a possible implementation, the communication apparatus activates one of the first antenna panel and the second antenna panel at a same time point.

In a possible implementation, a time offset between a last downlink reference signal resource in the downlink reference signal resource set and a $1^{st}$ uplink reference signal resource in the first uplink reference signal resource set is a preset value, or a time offset between a $1^{st}$ downlink reference signal resource in the downlink reference signal resource set and a last uplink reference signal resource in the first uplink reference signal resource set is a preset value, and the preset value is greater than or equal to an activation time period of an antenna panel of the communication apparatus.

In a possible implementation, the configuration information is further used to indicate an antenna panel used to measure the downlink reference signal and/or an antenna panel used to send the first uplink reference signal.

In a possible implementation, the configuration information is further used to indicate to use different antenna panels to measure the downlink reference signal and send the first uplink reference signal.

In a possible implementation, the configuration information is further used to configure a second uplink reference signal resource set associated with the downlink reference signal resource set.

The communication unit 1501 is further configured to send a second uplink reference signal to the network device based on the second uplink reference signal resource set by using the first antenna panel, where a transmission beam used to send the second uplink reference signal is determined based on a reception beam of a first downlink reference signal resource, and the first downlink reference signal resource is determined from the downlink reference signal resource set based on a measurement result of the downlink reference signal.

In a possible implementation, the communication unit 1501 is further configured to receive second indication information sent by the network device, where the second indication information is used to indicate a simultaneous-reception beam pair and/or a simultaneous-transmission beam pair of the communication apparatus, the simultaneous-transmission beam pair includes a first transmission beam and a second transmission beam, the simultaneous-reception beam pair includes a first reception beam corresponding to the first transmission beam and a second reception beam corresponding to the second transmission beam, the first transmission beam is a transmission beam determined by the network device based on a measurement result of the first uplink reference signal, and the second transmission beam is a transmission beam determined by the network device based on a measurement result of the second uplink reference signal.

In a possible implementation, a time point at which the first uplink reference signal is sent is the same as a time point at which the second uplink reference signal is sent.

In a possible implementation, the configuration information is further used to indicate an antenna panel used to measure the downlink reference signal and an antenna panel used to send the second uplink reference signal and/or indicate an antenna panel used to send the first uplink reference signal.

In a possible implementation, the configuration information is further used to indicate to use a same antenna panel to measure the downlink reference signal and send the second uplink reference signal, and indicate the communication apparatus to send the first uplink reference signal and the second uplink reference signal by using different antenna panels.

FIG. 15 is a schematic diagram of a structure of a communication apparatus according to an embodiment of this application. The communication apparatus shown in FIG. 15 may be configured to perform some or all functions of the network device in the method embodiment described in FIG. 6. The apparatus may be a network device, may be an apparatus in the network device, or may be an apparatus that can be used together with the network device. The communication apparatus may alternatively be a chip system. The communication apparatus shown in FIG. 15 may include a communication unit 1501 and a processing unit 1502. The processing unit 1502 is configured to process data.

The communication unit 1501 is configured to send configuration information to a terminal device, where the configuration information is used to configure a downlink reference signal resource set and a first uplink reference signal resource set associated with the downlink reference signal resource set. The communication unit 1501 is further configured to send a downlink reference signal to the terminal device based on the downlink reference signal resource set. The communication unit 1501 is further configured to receive first indication information fed back by the terminal device, where the first indication information includes information used to indicate a first downlink reference signal resource in the downlink reference signal resource set. The communication unit 1501 is further configured to measure, based on the first uplink reference signal resource set, a first uplink reference signal sent by the terminal device. The communication unit 1501 is further configured send second indication information to the terminal device, where the second indication information is used to indicate a simultaneous-reception beam pair and/or a simultaneous-transmission beam pair of the terminal device, the simultaneous-reception beam pair includes a first reception beam and a second reception beam, the simultaneous-transmission beam pair includes a first transmission beam and a second transmission beam, the first reception beam is a reception beam of the first downlink reference signal resource, the second transmission beam is a transmission beam determined based on a measurement result of the first uplink reference signal, the second reception beam is a reception beam corresponding to the second transmission beam, and the first transmission beam is a transmission beam corresponding to the first reception beam.

In a possible implementation, a time offset between a last downlink reference signal resource in the downlink reference signal resource set and a $1^{st}$ uplink reference signal resource in the first uplink reference signal resource set is a preset value, or a time offset between a $1^{st}$ downlink reference signal resource in the downlink reference signal resource set and a last uplink reference signal resource in the first uplink reference signal resource set is a preset value, and the preset value is greater than or equal to an activation time period of an antenna panel of the terminal device.

In a possible implementation, the configuration information is further used to indicate an antenna panel used to measure the downlink reference signal and/or an antenna panel used to send the first uplink reference signal.

In a possible implementation, the configuration information is further used to indicate to use different antenna panels to measure the downlink reference signal and send the first uplink reference signal.

FIG. 15 is a schematic diagram of a structure of a communication apparatus according to an embodiment of this application. The communication apparatus shown in FIG. 15 may be configured to perform some or all functions of the network device in the method embodiment described in FIG. 8. The apparatus may be a network device, may be an apparatus in the network device, or may be an apparatus that can be used together with the network device. The communication apparatus may alternatively be a chip system. The communication apparatus shown in FIG. 15 may include a communication unit 1501 and a processing unit 1502. The processing unit 1502 is configured to process data.

The communication unit 1501 is configured to send configuration information to a terminal device, where the configuration information is used to configure a downlink reference signal resource set and a first uplink reference signal resource set and a second uplink reference signal resource set that are associated with the downlink reference signal resource set. The communication unit 1501 is further configured to send a downlink reference signal to the terminal device based on the downlink reference signal resource set. The communication unit 1501 is further configured to measure, based on the first uplink reference signal resource set, a first uplink reference signal sent by the terminal device. The communication unit 1501 is further configured to measure, based on the second uplink reference signal resource set, a second uplink reference signal sent by the terminal device. The communication unit 1501 is further configured to send second indication information to the terminal device, where the second indication information is used to indicate a simultaneous-reception beam pair and/or a simultaneous-transmission beam pair of the terminal device, the simultaneous-transmission beam pair includes a first transmission beam and a second transmission beam, the simultaneous-reception beam pair includes a first reception beam corresponding to the first transmission beam and a second reception beam corresponding to the second transmission beam, the first transmission beam is a transmission beam determined based on a measurement result of the first uplink reference signal, and the second transmission beam is a transmission beam determined based on a measurement result of the second uplink reference signal.

In a possible implementation, the configuration information is further used to indicate an antenna panel used to measure the downlink reference signal and an antenna panel used to send the second uplink reference signal and/or indicate an antenna panel used to send the first uplink reference signal.

In a possible implementation, the configuration information is further used to indicate to use a same antenna panel to measure the downlink reference signal and send the second uplink reference signal, and indicate the terminal device to send the first uplink reference signal and the second uplink reference signal by using different antenna panels.

Figure 16A:
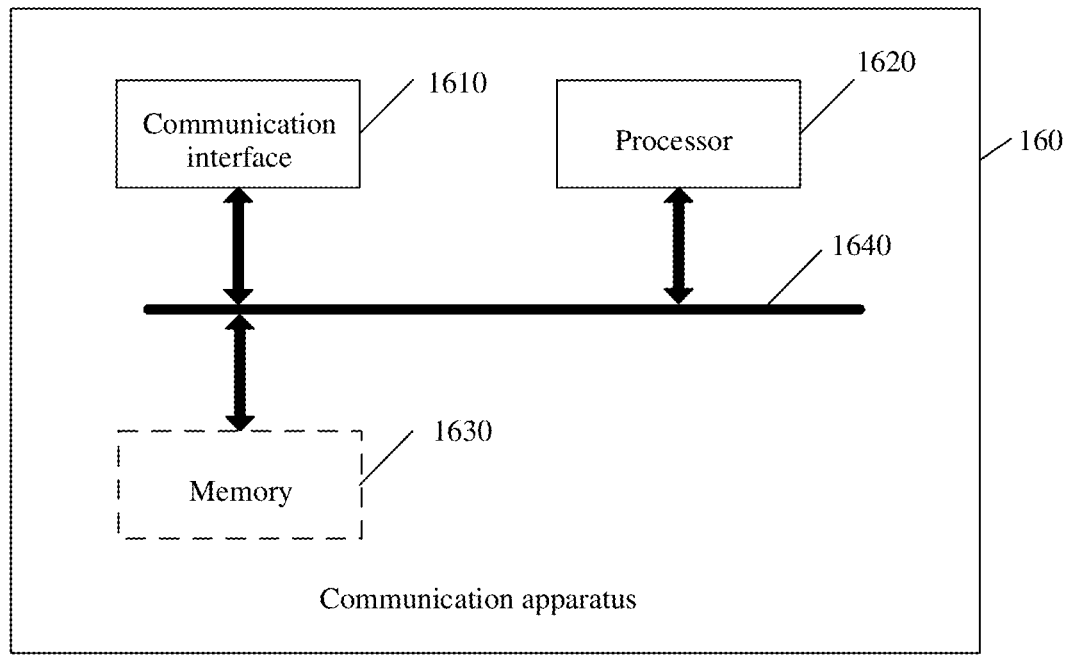
FIG. 16*a* is another example schematic diagram of a structure of a communication apparatus according to an embodiment of this application.

FIG. 16a shows a communication apparatus 160 according to an embodiment of this application. The communication apparatus 160 is configured to implement functions of the terminal device in FIG. 2, FIG. 6, or FIG. 8. The apparatus may be a terminal device or an apparatus used in the terminal device. The apparatus used in the terminal device may be a chip system or a chip in the terminal device. The chip system may include a chip, or may include a chip and another discrete component. Alternatively, the communication apparatus 160 is configured to implement functions of the network device in FIG. 2, FIG. 6, or FIG. 8. The apparatus may be a network device or an apparatus used in the network device. The apparatus used in the network device may be a chip system or a chip in the network device. The chip system may include a chip, or may include a chip and another discrete component.

The communication apparatus 160 includes at least one processor 1620, configured to implement a data processing function of the terminal device or the network device in the methods provided in embodiments of this application. The apparatus 160 may further include a communication interface 1610, configured to implement receiving and sending operations of the terminal device or the network device in the methods provided in embodiments of this application. In this embodiment of this application, the communication interface may be a transceiver, a circuit, a bus, a module, or a communication interface of another type, and is configured to communicate with another device through a transmission medium. For example, the communication interface 1610 is used for an apparatus in the apparatus 160 to communicate with another device. The processor 1620 receives and sends data through the communication interface 1610, and is configured to implement the method shown in FIG. 2, FIG. 6, or FIG. 8 in the foregoing method embodiments.

For example, when the communication apparatus 160 is a terminal device or an apparatus used in the terminal device, the communication interface 1610 may receive configuration information and perform operations 203 and 204. Alternatively, the communication interface 1610 may receive configuration information, perform operations 603 to 605, and receive second indication information. Alternatively, the communication interface 1610 may receive configuration information, perform operation 803, operation 805, and operation 806, and receive second indication information.

For another example, when the communication apparatus 160 is a network device or an apparatus used in the network device, the communication interface 1610 may perform operation 201, operation 202, and operation 205. Alternatively, the communication interface 1610 may perform operation 601, operation 602, operation 606, and operation 607. Alternatively, the communication interface 1610 may perform operation 801, operation 802, operation 805, operation 807, and operation 808.

The apparatus 160 may further include at least one memory 1630, configured to store program instructions and/or data. The memory 1630 is coupled to the processor 1620. The coupling in embodiments of this application is an indirect coupling or a communication connection between apparatuses, units, or modules in an electrical form, a mechanical form, or another form, and is used for information exchange between the apparatuses, the units, or the modules. The processor 1620 may cooperate with the memory 1630. The processor 1620 may execute the program instructions stored in the memory 1630. At least one of the at least one memory may be included in the processor.

A specific connection medium between the communication interface 1610, the processor 1620, and the memory 1630 is not limited in this embodiment of this application. In this embodiment of this application, in FIG. 16a, the memory 1630, the processor 1620, and the communication interface 1610 are connected through a bus 1640. The bus is represented by a thick line in FIG. 16a. A manner of connection between other components is merely an example for description, and is not limited thereto. The bus may be classified into an address bus, a data bus, a control bus, and the like. For ease of representation, only one thick line is used to represent the bus in FIG. 16a, but this does not mean that there is only one bus or only one type of bus.

When the apparatus 160 is specifically the apparatus used in the terminal device or the network device, for example, when the apparatus 160 is specifically a chip or a chip system, the communication interface 1610 may output or receive a baseband signal. When the apparatus 160 is specifically the terminal device or the network device, the communication interface 1610 may output or receive a radio frequency signal. In this embodiment of this application, the processor may be a general-purpose processor, a digital signal processor, an application-specific integrated circuit, a field programmable gate array or another programmable logic device, a discrete gate or a transistor logic device, or a discrete hardware component, and may implement or perform the methods, operations, and logical block diagrams disclosed in this embodiment of this application. The general-purpose processor may be a microprocessor, any conventional processor, or the like. The operations in the methods disclosed with reference to the embodiments of this application may be directly performed and completed by a hardware processor, or may be performed and completed by a combination of hardware in the processor and a software module.

Figure 16B:
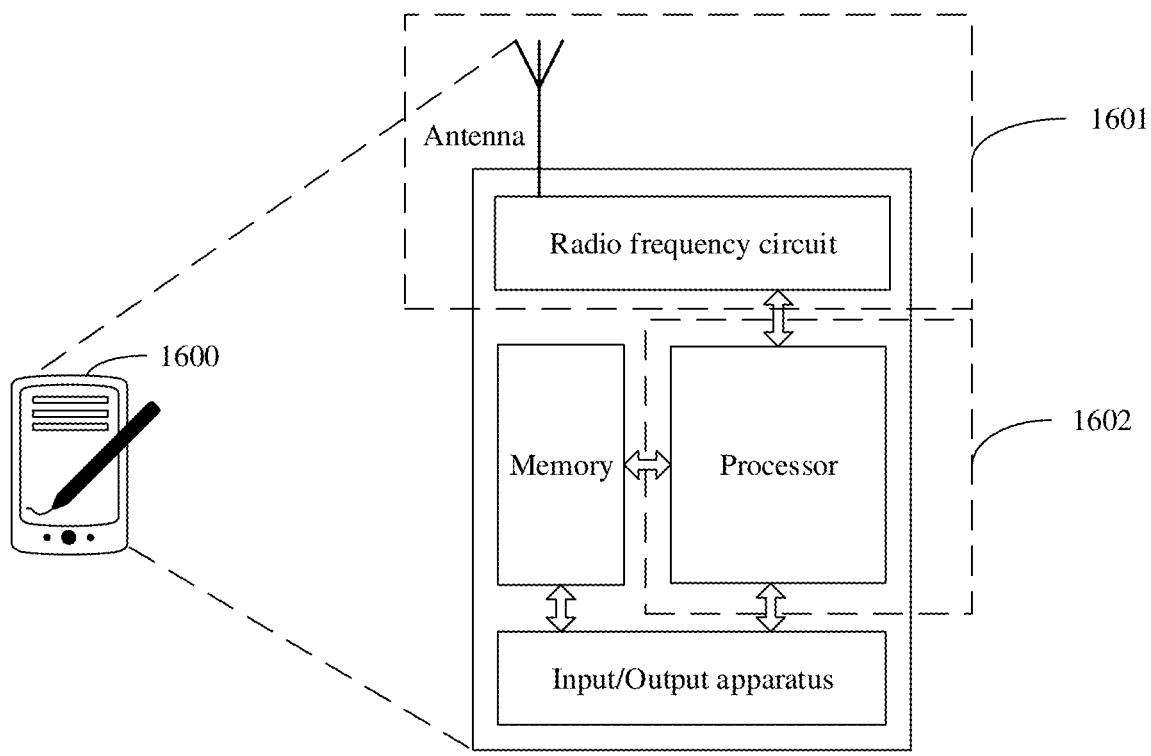
FIG. 16*b* is still another example schematic diagram of a structure of a communication apparatus according to an embodiment of this application.

For example, FIG. 16b is a schematic diagram of a structure of a terminal device 1600 according to an embodiment of this application. The terminal device may perform the operations performed by the terminal device in the foregoing method embodiments.

For ease of description, FIG. 16b shows only main components of the terminal device. As shown in FIG. 16b, the terminal device 1600 includes a processor, a memory, a radio frequency circuit, an antenna, and an input/output apparatus. The processor is mainly configured to: process a communication protocol and communication data, control the entire terminal device, execute a software program, and process data of the software program. For example, the processor is configured to support the terminal device in performing the procedures described in FIG. 2, FIG. 6, and FIG. 8. The memory is configured to store the software program and the data. The radio frequency circuit is mainly configured to perform conversion between a baseband signal and a radio frequency signal, and process the radio frequency signal. The antenna is mainly configured to receive and send a radio frequency signal in a form of an electromagnetic wave. The terminal device 1600 may further include the input/output apparatus, such as a touchscreen, a display screen, or a keyboard, and the input/output apparatus is mainly configured to receive data entered by a user and output data to the user. It should be noted that some types of terminal devices may have no input/output apparatus.

After the terminal device is powered on, the processor may read a software program in a storage unit, explain and execute instructions of the software program, and process data of the software program. When data needs to be wirelessly sent, after performing baseband processing on the to-be-sent data, the processor outputs a baseband signal to a radio frequency circuit. After performing radio frequency processing on the baseband signal, the radio frequency circuit sends a radio frequency signal in the electromagnetic wave form through the antenna. When data is to be sent to the terminal device, the radio frequency circuit receives the radio frequency signal through the antenna, converts the radio frequency signal into a baseband signal, and outputs the baseband signal to the processor. The processor converts the baseband signal into data and processes the data.

Persons skilled in the art may understand that for ease of description, FIG. 16b shows only one memory and one processor. An actual terminal device may include a plurality of processors and memories. The memory may also be referred to as a storage medium, a storage device, or the like. This is not limited in this embodiment of this application.

In an optional implementation, the processor may include a baseband processor and a central processing unit (CPU). The baseband processor is mainly configured to process a communication protocol and communication data. The CPU is mainly configured to: control the entire terminal device, execute a software program, and process data of the software program. Optionally, the processor may alternatively be a network processor (NP) or a combination of the CPU and the NP. The processor may further include a hardware chip. The foregoing hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. The memory may include a volatile memory, for example, a random access memory (RAM). The memory may alternatively include a non-volatile memory, for example, a flash memory, a hard disk drive (HDD), or a solid-state drive (SSD). The memory may alternatively include a combination of the foregoing types of memories.

For example, in this embodiment of this application, as shown in FIG. 16b, the antenna and the radio frequency circuit that have a transceiver function may be considered as a communication unit 1601 of the terminal device 1600, and the processor having a processing function may be considered as a processing unit 1602 of the terminal device 1600.

The communication unit 1601 may also be referred to as a transceiver, a transceiver machine, a transceiver apparatus, a transceiver unit, or the like, and is configured to implement the sending and receiving functions. Optionally, a component that is in the communication unit 1601 and that is configured to implement the receiving function may be considered as a receiving unit, and a component that is in the communication unit 1601 and that is configured to implement the sending function may be considered as a sending unit. That is, the communication unit 1601 includes the receiving unit and the sending unit. For example, the receiving unit may also be referred to as a receiver machine, a receiver, a receiver circuit, or the like. The sending unit may be referred to as a transmitter machine, a transmitter, a transmitter circuit, or the like.

In some embodiments, the communication unit 1601 and the processing unit 1602 may be integrated into one component, or may be separated as different components. In addition, the processor and the memory may be integrated into one component, or may be separated as different components.

The communication unit 1601 may be configured to perform receiving and sending operations of the terminal device in the foregoing method embodiments. The processing unit 1602 may be configured to perform a data processing operation of the terminal device in the foregoing method embodiments.

An embodiment of this application further provides a computer-readable storage medium. The computer-readable storage medium stores instructions. When the instructions run on a processor, a method procedure in the foregoing method embodiment is implemented.

An embodiment of this application further provides a computer program product. When the computer program product runs on a processor, a method procedure in the foregoing method embodiment is implemented.

It should be noted that, for brief description, the foregoing method embodiment is represented as a combination of a series of actions. However, persons skilled in the art should understand that this application is not limited to the described order of the actions, because according to this application, some operations may be performed in other orders or simultaneously. It should be further appreciated by persons skilled in the art that embodiments described in this specification all belong to example embodiments, and the involved actions and modules are not necessarily required by this application.

Cross reference may be made to descriptions of embodiments provided in this application, and the descriptions of embodiments have different focuses. For a part not described in detail in an embodiment, refer to related descriptions of another embodiment. For ease of description and brevity, for functions of the apparatuses and devices provided in the embodiments of this application and operations performed by the apparatuses and devices, refer to related descriptions of the method embodiments of this application. The method embodiments and the apparatus embodiments may also be mutually referenced, combined, or cited.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A method for beam pair training, comprising:
receiving configuration information sent by a network device, wherein
the configuration information is used to configure a downlink reference signal resource set and a first uplink reference signal resource set, and the first uplink reference signal resource set is associated with the downlink reference signal resource set;
measuring, based on the downlink reference signal resource set and by using a first antenna panel of a terminal device, a downlink reference signal sent by the network device; and
sending a first uplink reference signal to the network device, based on the first uplink reference signal resource set, by using a second antenna panel of the terminal device, wherein the first antenna panel is different from the second antenna panel,
feeding back first indication information to the network device based on a measurement result associated with measuring downlink reference signal, wherein the first indication information indicates a first downlink reference signal resource in the downlink reference signal resource set; and
after sending the first uplink refer to the network device, the method further comprises:
receiving second indication information sent by the network device, wherein
the second indication information indicates a simultaneous-reception beam pair and/or a simultaneous-transmission beam pair of the terminal device,
the simultaneous-reception beam pair comprises a first reception beam and a second reception beam,
the simultaneous-transmission beam pair comprises a first transmission beam and a second transmission beam,
the first reception beam is a reception beam of the first downlink reference signal resource,
the second transmission beam is determined by the network device based on a measurement result of measuring the first uplink reference signal,
the second reception beam corresponds to the second transmission beam, and
the first transmission beam corresponds to the first reception beam.

2. The method according to claim 1, wherein a transmission beam used to send the first uplink reference signal is determined based on the first reception beam.

3. The method according to claim 1, wherein the downlink reference signal resource set comprises:
a channel measurement resource set and an interference measurement resource set corresponding to the channel measurement resource set, wherein the first downlink reference signal resource is a first channel measurement resource,
the first channel measurement resource corresponds to a first interference measurement resource, and
a transmission beam used to send the first uplink reference signal is determined based on a transmission beam used by the network device to send the first interference measurement resource.

4. The method according to claim 1, wherein the terminal device activates one of the first antenna panel and the second antenna panel at a same point in time.

5. The method according to claim 1, wherein
a time offset between a last downlink reference signal resource, in the downlink reference signal resource set, and a first uplink reference signal resource in the first uplink reference signal resource set is a preset value, or
a time offset between a first downlink reference signal resource in the downlink reference signal resource set and a last uplink reference signal resource in the first uplink reference signal resource set is a preset value, and the preset value is greater than or equal to an activation time period of an antenna panel of the terminal device.

6. The method according to claim 1, wherein the configuration information further indicates an antenna panel used to measure the downlink reference signal and/or an antenna panel used to send the first uplink reference signal.

7. The method according to claim 1, wherein the configuration information further indicates to use different antenna panels to measure the downlink reference signal and send the first uplink reference signal.

8. The method according to claim 1, wherein
the configuration information is further used to configure a second uplink reference signal resource set associated with the downlink reference signal resource set, and
the method further comprises:
sending a second uplink reference signal to the network device, based on the second uplink reference signal resource set, by using the first antenna panel, wherein
a transmission beam used to send the second uplink reference signal is determined based on a reception beam of a first downlink reference signal resource, and
the first downlink reference signal resource is determined from the downlink reference signal resource set based on a measurement result of measuring the downlink reference signal.

9. The method according to claim 8, further comprising:
receiving second indication information sent by the network device, wherein
the second indication information indicates a simultaneous-reception beam pair and/or a simultaneous-transmission beam pair of the terminal device,
the simultaneous-transmission beam pair comprises a first transmission beam and a second transmission beam,
the simultaneous-reception beam pair comprises a first reception beam corresponding to the first transmission beam and a second reception beam corresponding to the second transmission beam,
the first transmission beam is determined by the network device based on a measurement result of measuring the first uplink reference signal, and
the second transmission beam is determined by the network device based on a measurement result of measuring the second uplink reference signal.

10. The method according to claim 8, wherein a point in time at which the first uplink reference signal is sent is a same point in time at which the second uplink reference signal is sent.

11. The method according to claim 8, wherein the configuration information further indicates an antenna panel used to measure the downlink reference signal and an antenna panel used to send the second uplink reference signal and/or indicates an antenna panel used to send the first uplink reference signal.

12. The method according to claim 8, wherein the configuration information further indicates to use a same antenna panel to measure the downlink reference signal and send the second uplink reference signal, and indicates the terminal device to send the first uplink reference signal and the second uplink reference signal by using different antenna panels.

13. A method for beam pair training, comprising:
sending configuration information to a terminal device, wherein
the configuration information is used to configure a downlink reference signal resource set and a first uplink reference signal resource set associated with the downlink reference signal resource set;
sending a downlink reference signal to the terminal device based on the downlink reference signal resource set;
receiving first indication information fed back by the terminal device, wherein
the first indication information indicates a first downlink reference signal resource in the downlink reference signal resource set;
measuring, based on the first uplink reference signal resource set, a first uplink reference signal sent by the terminal device; and
sending second indication information to the terminal device, wherein
the second indication information indicates a simultaneous-reception beam pair and/or a simultaneous-transmission beam pair of the terminal device,
the simultaneous-reception beam pair comprises a first reception beam and a second reception beam,
the simultaneous-transmission beam pair comprises a first transmission beam and a second transmission beam,
the first reception beam is a reception beam of the first downlink reference signal resource,
the second transmission beam is determined based on a measurement result of measuring the first uplink reference signal,
the second reception beam corresponds to the second transmission beam, and
the first transmission beam corresponds to the first reception beam.

14. The method according to claim 13, wherein
a time offset between a last downlink reference signal resource in the downlink reference signal resource set and a first uplink reference signal resource in the first uplink reference signal resource set is a preset value, or
a time offset between a first downlink reference signal resource in the downlink reference signal resource set and a last uplink reference signal resource in the first uplink reference signal resource set is a preset value, and the preset value is greater than or equal to an activation time period of an antenna panel of the terminal device.

15. The method according to claim 13, wherein the configuration information further indicates an antenna panel used to measure the downlink reference signal and/or an antenna panel used to send the first uplink reference signal.

16. The method according to claim 13, wherein the configuration information further indicates to use different antenna panels to measure the downlink reference signal and send the first uplink reference signal.

17. A method for beam pair training, comprising:
sending configuration information to a terminal device, wherein
the configuration information is used to configure a downlink reference signal resource set, and a first uplink reference signal resource set and a second uplink reference signal resource set, that are associated with the downlink reference signal resource set;
sending a downlink reference signal to the terminal device based on the downlink reference signal resource set;
measuring, based on the first uplink reference signal resource set, a first uplink reference signal sent by the terminal device;
measuring, based on the second uplink reference signal resource set, a second uplink reference signal sent by the terminal device; and
sending second indication information to the terminal device, wherein
the second indication information indicates a simultaneous-reception beam pair and/or a simultaneous-transmission beam pair of the terminal device,
the simultaneous-transmission beam pair comprises a first transmission beam and a second transmission beam,
the simultaneous-reception beam pair comprises a first reception beam corresponding to the first transmission beam and a second reception beam corresponding to the second transmission beam,
the first transmission beam is determined based on a measurement result of measuring the first uplink reference signal, and
the second transmission beam is determined based on a measurement result of measuring the second uplink reference signal.

18. The method according to claim 17, wherein the configuration information further indicates an antenna panel used to measure the downlink reference signal and an antenna panel used to send the second uplink reference signal and/or indicate an antenna panel used to send the first uplink reference signal.

19. The method according to claim 17, wherein the configuration information further indicates to use a same antenna panel to measure the downlink reference signal and send the second uplink reference signal, and indicates the terminal device to send the first uplink reference signal and the second uplink reference signal by using different antenna panels.

20. The method according to claim 17, wherein
a time offset between a last downlink reference signal resource, in the downlink reference signal resource set, and a first uplink reference signal resource in at least the first uplink reference signal resource set is a preset value, or
a time offset between a first downlink reference signal resource in the downlink reference signal resource set and a last uplink reference signal resource in at least the first uplink reference signal resource set is a preset value, and the preset value is greater than or equal to an activation time period of an antenna panel of the terminal device.

* * * * *